US012352079B2

(12) United States Patent
Perez Barrera et al.

(10) Patent No.: US 12,352,079 B2
(45) Date of Patent: Jul. 8, 2025

(54) DETECTION AND AVOIDANCE OF CAR DOORING OF CYCLISTS

(71) Applicant: Volvo Car Corporation, Gothenburg (SE)

(72) Inventors: Oswaldo Perez Barrera, Gothenburg (SE); Anders Lennartsson, Gothenburg (SE)

(73) Assignee: Volvo Car Corporation, Gothenburg (SE)

( * ) Notice: Subject to any disclaimer, the term of this patent is extended or adjusted under 35 U.S.C. 154(b) by 162 days.

(21) Appl. No.: 18/299,258

(22) Filed: Apr. 12, 2023

(65) Prior Publication Data
US 2024/0344369 A1   Oct. 17, 2024

(51) Int. Cl.
    *E05B 77/08*    (2014.01)
    *B60Q 9/00*    (2006.01)
    (Continued)

(52) U.S. Cl.
    CPC ............... *E05B 77/08* (2013.01); *B60Q 9/00* (2013.01); *B60R 21/34* (2013.01); *E05B 81/56* (2013.01);
    (Continued)

(58) Field of Classification Search
CPC ......... E05B 77/08; E05B 81/56; G06V 20/58; G06V 40/20; G06V 40/178; B60Q 9/00;
(Continued)

(56) References Cited

U.S. PATENT DOCUMENTS 7,280,035 B2 * 10/2007 McLain .................. E05C 17/00
    340/436
8,600,606 B2 * 12/2013 Nickolaou ...... B60W 30/18054
    367/87
(Continued)

FOREIGN PATENT DOCUMENTS

CN    106143299 A  * 11/2016  ............. B60Q 9/008
CN    109109740 A  *  1/2019
(Continued)

OTHER PUBLICATIONS

"SAE J3016TM Levels of Driving Automation" SAE International, https://www.sae.org/binaries/content/assets/cm/content/blog/sae-j3016-visual-chart_5.3.21.pdf, Last Accessed Mar. 28, 2023, 1 page.
(Continued)

*Primary Examiner* — Chico A Foxx
(74) *Attorney, Agent, or Firm* — Amin, Turocy & Watson, LLP

(57) ABSTRACT

Various systems and methods are presented regarding utilizing technology onboard a vehicle to minimize road traffic accidents between cyclists and vehicles. A vehicle can be operating in any of an autonomous, partially autonomous, or non-autonomous manner. By utilizing onboard technology/artificial intelligence, the vehicle can detect a cyclist navigating a street proximate to the vehicle, and further determine, if a door of the vehicle was opened, whether a car dooring incident would result involving the cyclist. In response to a determination that a car dooring incident is likely, an onboard system can prevent an occupant from opening a door likely to cause the dooring incident. Accordingly, the vehicle can preemptively adjust available operations to prevent a car dooring incident.

20 Claims, 16 Drawing Sheets

(51) Int. Cl.
| | |
|---|---|
| *B60R 21/34* | (2011.01) |
| *E05B 81/56* | (2014.01) |
| *G06T 7/20* | (2017.01) |
| *G06V 20/58* | (2022.01) |
| *G06V 40/20* | (2022.01) |
| *G06V 40/16* | (2022.01) |

(52) U.S. Cl.
CPC ............... *G06T 7/20* (2013.01); *G06V 20/58* (2022.01); *G06V 40/20* (2022.01); *G06T 2207/10016* (2013.01); *G06T 2207/30252* (2013.01); *G06V 40/178* (2022.01)

(58) Field of Classification Search
CPC . B60R 21/34; G06T 7/20; G06T 2207/10016; G06T 2207/30252
See application file for complete search history.

(56) References Cited

U.S. PATENT DOCUMENTS

| | | | |
|---|---|---|---|
| 8,620,549 B2 * | 12/2013 | Nickolaou | B60Q 9/008 701/70 |
| 10,596,958 B2 | 10/2020 | Rowell | |
| 11,268,315 B2 | 3/2022 | Kothari | |
| 11,926,344 B1 * | 3/2024 | Roy | G08G 1/04 |
| 2005/0085972 A1 * | 4/2005 | Martinez | E05C 17/00 701/49 |
| 2006/0187304 A1 * | 8/2006 | Sakata | H04N 7/181 348/148 |
| 2008/0218381 A1 * | 9/2008 | Buckley | B60Q 1/544 340/932.2 |
| 2009/0033477 A1 * | 2/2009 | Illium | E05C 17/00 280/727 |
| 2011/0196568 A1 * | 8/2011 | Nickolaou | B60W 30/0953 367/87 |
| 2014/0098230 A1 * | 4/2014 | Baur | B60Q 9/008 348/148 |
| 2014/0118130 A1 * | 5/2014 | Chang | B60Q 1/525 340/435 |
| 2015/0103175 A1 * | 4/2015 | Lee | B60R 25/1001 348/148 |
| 2015/0175072 A1 * | 6/2015 | Sabeti | G06V 20/58 348/148 |
| 2015/0191117 A1 * | 7/2015 | Arita | G10K 11/26 340/435 |
| 2016/0208537 A1 * | 7/2016 | Senguttuvan | B60Q 9/00 |
| 2018/0075747 A1 * | 3/2018 | Pahwa | G08G 1/205 |
| 2020/0074847 A1 * | 3/2020 | Wang | B60Q 1/547 |
| 2020/0156535 A1 * | 5/2020 | Lee | B60Q 1/543 |
| 2020/0156543 A1 * | 5/2020 | Kubota | B60R 1/26 |
| 2020/0247434 A1 * | 8/2020 | Kim | G08G 1/166 |
| 2021/0304611 A1 | 9/2021 | Hughes et al. | |

FOREIGN PATENT DOCUMENTS

| | | | | |
|---|---|---|---|---|
| DE | 102004049054 A1 | | 4/2006 | |
| EP | 3653440 A1 * | | 5/2020 | ............. B60K 35/00 |
| GB | 2515099 A * | | 12/2014 | ................ B60J 5/00 |
| JP | 2002225560 A * | | 8/2002 | |
| JP | 2006103526 A * | | 4/2006 | |
| JP | 2007148618 A * | | 6/2007 | |
| JP | 3196634 U * | | 3/2015 | |
| WO | 2022180314 A1 | | 9/2022 | |

OTHER PUBLICATIONS

Vivek C Venkatesh PL "Safety Locking System of Car Door Using Sensors" International Journal of Science and Research (IJSR), vol. 5 Issue 3, Mar. 2016, 5 pages.

Fernandez et al. "Glasses detection on real images based on robust alignment" Machine Vision and Applications, Mar. 31, 2014, 13 pages.

HyundaiWorldwide "Hyundai Car Features | Electronic Child Safety Lock (Safe Exit Assist)" HyundaiWorldwide, Youtube, https://www.youtube.com/watch?v=V6gk3PNjpaE&t=52s, Last Accessed Apr. 5, 2023.

Ford News Europe "New Car Tech Could Help Stop Drivers 'Dooring' Cyclists" Ford News Europe, Youtube, https://www.youtube.com/watch?v=LpNntsGs9JQ, Last Accessed Apr. 5, 2023.

Cheng, et al "Curb Detection for Road and Sidewalk Detection" IEEE Transactions On Vehicular Technology, vol. 67, No. 11, Nov. 2018, 13 pages.

Dhingra, Naina, "HeadPosr: End-to-end Trainable Head Pose Estimation using Transformer Encoders", IEEE, arXiv:2202.03548v1, Feb. 7, 2022, 8 pages.

Zharovskikh, Anastasiya, "Head Pose Estimation withComputer Vision", InData Labs, Online available at URL: https://indatalabs.com/blog/head-pose-estimation-with-cv, Jan. 19, 2021, 10 pages.

Lee, Yooyoung, "VASIR: Video-based Automatic System for Iris Recognition", 90th Doctoral Dissertation, Major in Computer Vision Department of Computer Science and Engineering, Feb. 2012, 263 pages.

Fernandez, et al., "Glasses detection on real images based on robust alignment," Machine Vision and Applications, DOI 10.1007/s00138-015-0674-1, Published Online: Mar. 31, 2015.

* cited by examiner

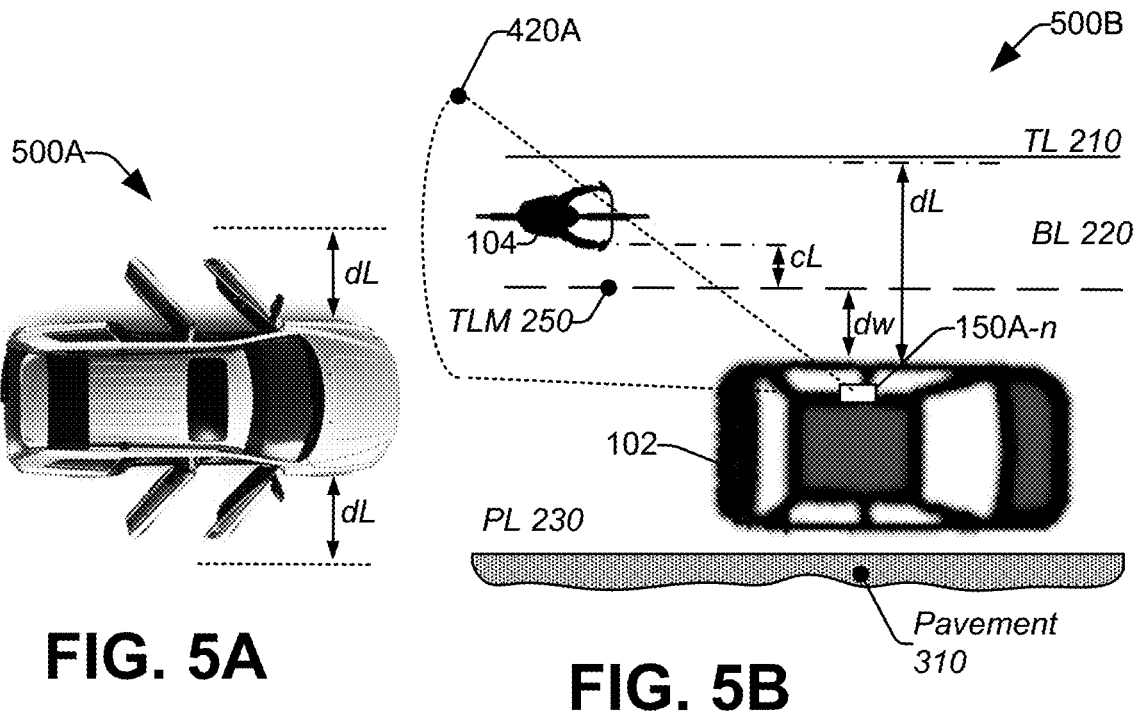
FIG. 5A
FIG. 5B
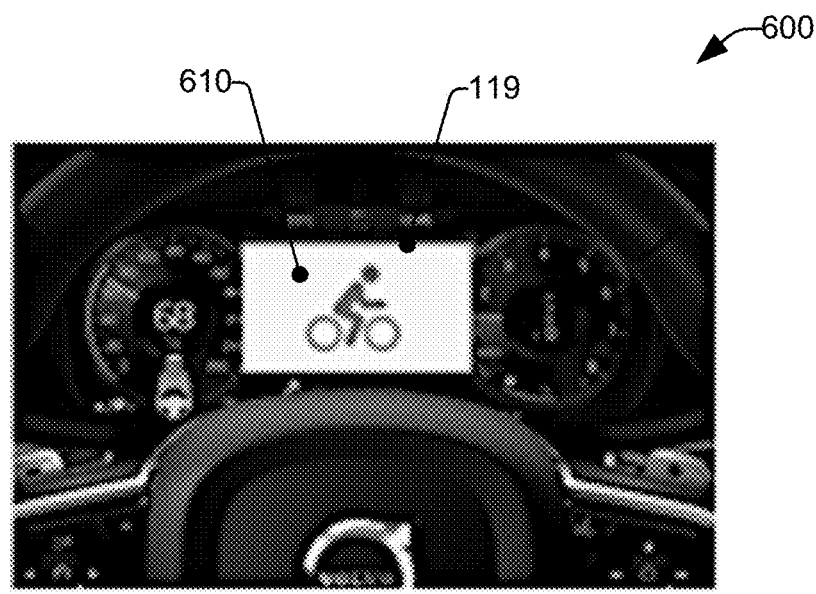
FIG. 6

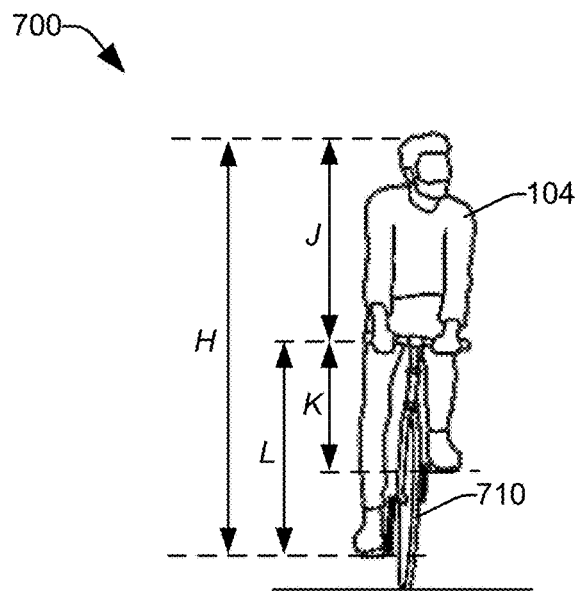
FIG. 7
FIG. 11
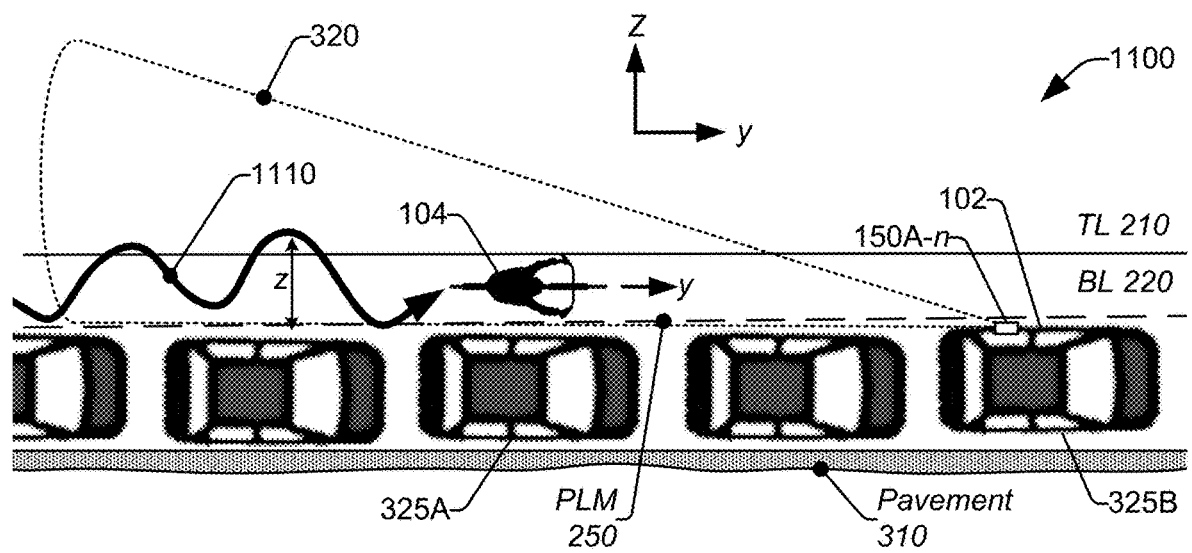

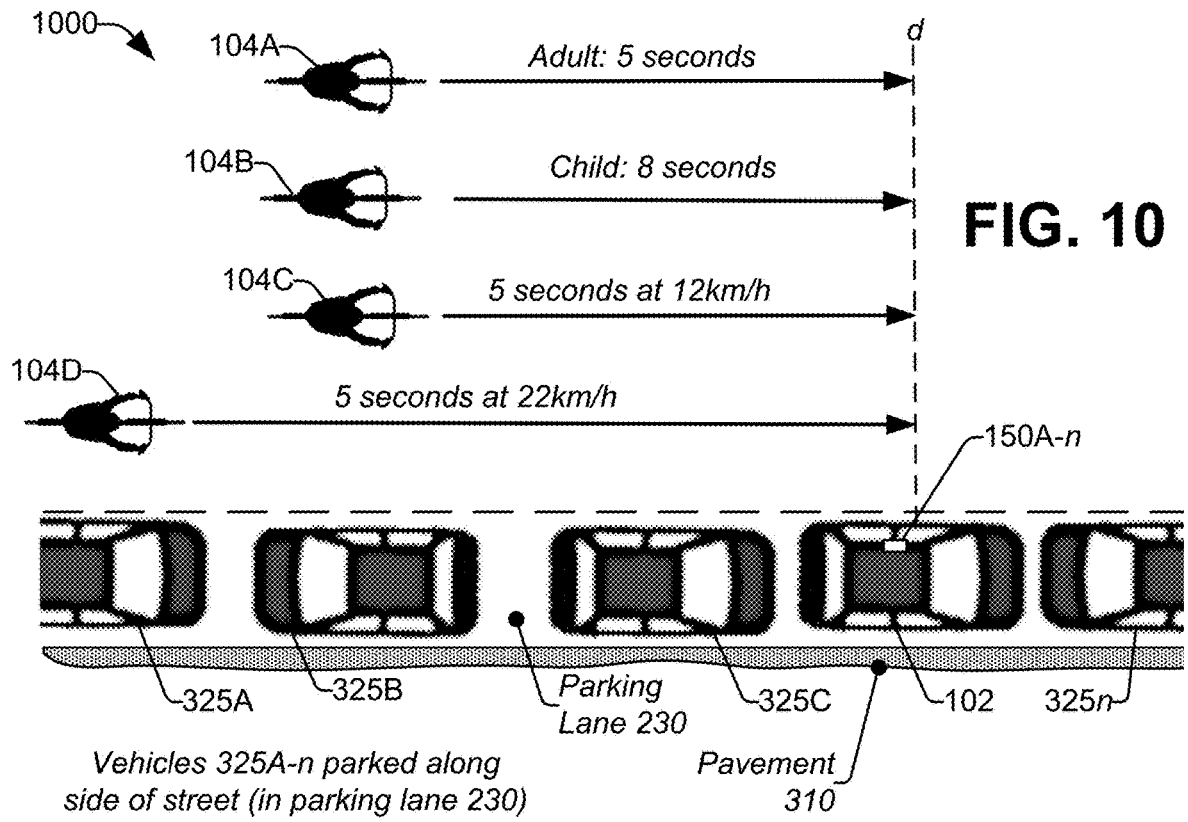
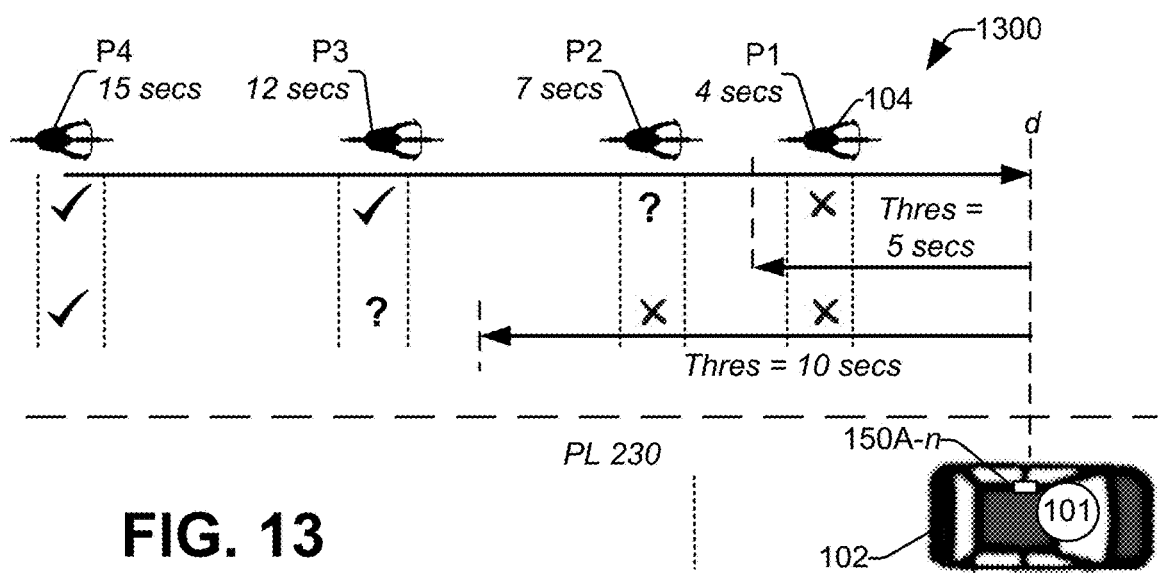

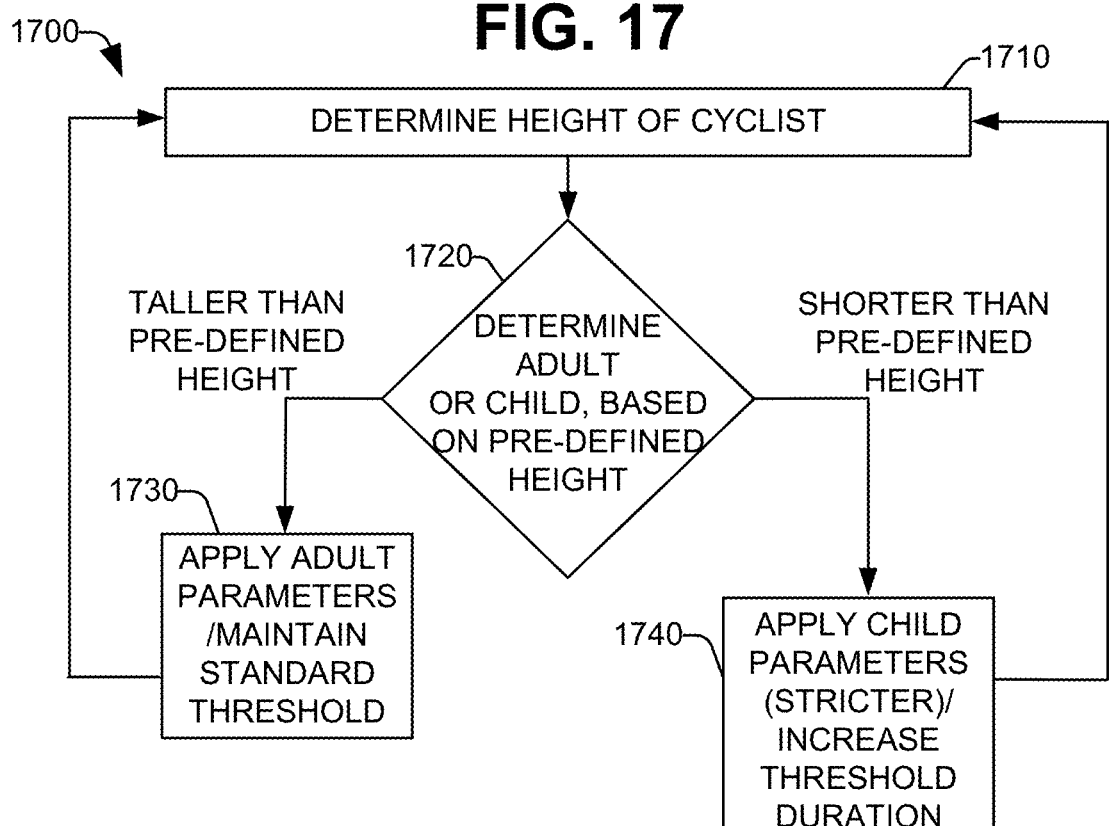
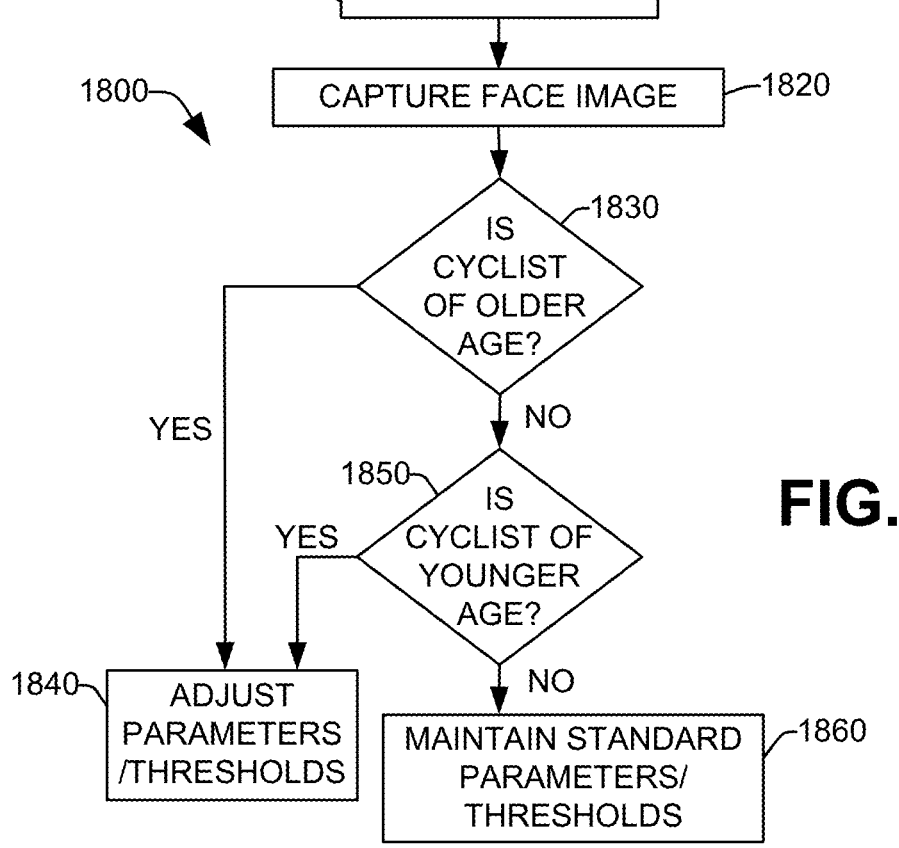
FIG. 17
FIG. 18

SAE J3016™ LEVELS OF DRIVING AUTOMATION 2018-06

| | LEVEL 0 | LEVEL 1 | LEVEL 2 | LEVEL 3 | LEVEL 4 | LEVEL 5 |
|---|---|---|---|---|---|---|
| What does the human in driver's seat have to do? | You <u>are</u> driving whenever these driver support features are engaged – even if your feet are off the pedals and you are not steering. You must constantly supervise these support features; you must steer, brake or accelerate as needed to maintain safety | | | You <u>are not</u> driving whenever these automated driving features are engaged – even if you are seated in "the driver's seat". When the feature requests, you <u>must drive</u> | These automated driving features will not require you to take over driving | |
| | These are driver support features | | | These are automated driving features | | |
| What do these features do? | These features are limited to providing warnings and momentary assistance | These features provide steering OR brake/ acceleration support to the driver | These features provide steering AND brake/ acceleration support to the driver | These features can drive the vehicle under limited conditions and will not operate unless all required conditions are met | These features can drive the vehicle under limited conditions unless all required conditions are met | This feature can drive the vehicle under all conditions |
| Example Features | • automatic emergency braking<br>• blind spot warning<br>• lane departure warning | • lane centering OR<br>• adaptive cruise control | • lane centering AND<br>• adaptive cruise control at the same time | • traffic jam chauffeur | • local driverless taxi<br>• pedals/ steering wheel may or may not be installed | • same as level 4, but feature can drive everywhere in all conditions |

FIG. 24 (Prior Art)

DETECTION AND AVOIDANCE OF CAR DOORING OF CYCLISTS

TECHNICAL FIELD

This application relates to techniques facilitating operation of a vehicle to prevent a car dooring incident occurring with a cyclist.

BACKGROUND

With roads being commonly shared between drivers, cyclists, and pedestrians, the potential for accidents is of concern, and happens too frequently. One common accident is "dooring", where a driver opens the car door into the path of another road user, typically a cyclist. Dooring involves a driver or passenger opening a vehicle door without previously checking in the rearview/side mirror, over their shoulder, and suchlike, wherein the open door is in the path of a cyclist. Where there is sufficient time to respond and the cyclist sees the door being opened, the cyclist may be able to avoid the door being opened by altering their course around the door, but that may cause the cyclist to veer into an adjacent lane (e.g., out of a bicycle lane and into vehicle traffic). In the worst case, the cyclist collides with the door, which can further lead them to fall into the path of moving traffic. To minimize the risk of being doored, cyclists will often ride as far away from parked cars as possible, which further increases the likelihood of the cyclist straying into traffic to avoid a door being opened.

The above-described background is merely intended to provide a contextual overview of some current issues and is not intended to be exhaustive. Other contextual information may become further apparent upon review of the following detailed description.

SUMMARY

The following presents a summary to provide a basic understanding of one or more embodiments described herein. This summary is not intended to identify key or critical elements, or delineate any scope of the different embodiments and/or any scope of the claims. The sole purpose of the summary is to present some concepts in a simplified form as a prelude to the more detailed description presented herein.

In one or more embodiments described herein, systems, devices, computer-implemented methods, methods, apparatus and/or computer program products are presented to mitigate dooring incidents between vehicles and cyclists.

According to one or more embodiments, a system can be located on a vehicle, wherein the first vehicle can be operating at least autonomously, partially autonomously, and suchlike. The system can comprise a memory that stores computer executable components and a processor that executes the computer executable components stored in the memory. The computer executable components can comprise an accident component configured to determine proximity of a cyclist to the vehicle, wherein the cyclist is cycling on a road where the vehicle is parked; determine probability of dooring incident occurring in the event of an occupant of the vehicle opening a door to exit the vehicle when the cyclist is proximate to the vehicle; and further, in response to a first determination that the determined probability is above a probability threshold, generate a first instruction to prevent the occupant from exiting the vehicle until the determined probability is below the probability threshold.

In a further embodiment, the computer executable components can further comprise a lock component configured to: receive the first instruction; and prevent opening of a car door while the determined probability of a dooring incident occurring is above the probability threshold.

In a further embodiment, the computer executable components can further comprise a screen component configured to present a notification to the occupant that the occupant that the door is temporarily locked until the cyclist has passed the vehicle.

In an embodiment, the accident detection component can be further configured to determine the cyclist has passed the vehicle; and in response to determining the cyclist has passed the vehicle, generate a second instruction instructing the lock component to open the car door; and wherein, in response to receiving the second notification, the lock component is further configured to unlock the car door.

In another embodiment, the probability threshold can be based in part on a first duration required by the occupant to safely open the door and exit the vehicle.

In a further embodiment, the computer executable components can further comprise a cyclist component configured to determine, at least one of: an age of the cyclist; a level of distraction of the cyclist; or stability of the cyclist on a bicycle as cyclist approaches the vehicle; and notify the accident component regarding the at least one of the determined age of the cyclist, the level of distraction of the cyclist, or the stability of the cyclist.

In an embodiment, the level of distraction of the cyclist can be based on at least one of: visual focus of attention of the cyclist regarding an environment in which the cyclist is travelling; steering the bicycle with hands holding handlebars of the bicycle; or interaction with a portable device while operating the bicycle.

In a further embodiment, the age of the cyclist can be determined based on at least one of: a determined height of the cyclist; or facial analysis of the cyclist.

In another embodiment, the accident component can be further configured to adjust the duration of the threshold from the first duration to a second duration in accordance with at least one of the determined age of the cyclist, the level of distraction of the cyclist, or the stability of the cyclist.

In another embodiment, the computer executable components can further comprise a camera configured to capture a sequence of images indicating a current location or velocity of the cyclist.

In a further embodiment, the cyclist component can be further configured to: receive the sequence of images from the camera; determine, based on the sequence of images, speed of travel of the cyclist; determine, based on the sequence of images, direction of travel of the cyclist; and transmit a notification of the determined speed of travel of the cyclist and the determined direction of travel of the cyclist. In a further embodiment, the accident detection component can be further configured to determine the proximity of the cyclist to the vehicle based on the determined speed and direction of travel of the cyclist.

In another embodiment, the accident component can be further configured to, in response to a second determination that the determined probability is below the probability threshold, generate a second instruction enabling the occupant to exit the vehicle.

In a further embodiment, the computer executable components can further comprise at least one of a camera or a sensor configured to detect the location of the occupant, wherein the door is proximate to the occupant.

In other embodiments, elements described in connection with the disclosed systems can be embodied in different forms such as computer-implemented methods, computer program products, or other forms. For example, in an embodiment, a computer-implemented method can be performed by a device operatively coupled to a processor, wherein the device can be located on a vehicle. In an embodiment, the method can comprise: determining, by a device comprising a processor located on a vehicle, a proximity of a cyclist to the vehicle, wherein the cyclist is cycling on a road where the vehicle is parked; determining probability of dooring incident occurring in the event of an occupant of the vehicle opening a door to exit the vehicle when the cyclist is proximate to the vehicle; and further comprise, in response to a first determination that the determined probability is above a probability threshold, generating a first instruction to prevent the occupant from exiting the vehicle until the determined probability is below the probability threshold.

In another embodiment, the method can further comprise, in response to a second determination that the determined probability is below a probability threshold, generating a second instruction, wherein the second instruction causing unlocking of a door proximate to the occupant, enabling the occupant to exit the vehicle.

In an embodiment, the probability threshold can be based in part on at least one of: a determined age of the of the cyclist; a determined level of distraction of the cyclist; or a determined stability of the cyclist on a bicycle as cyclist approaches the vehicle.

Further embodiments can include a computer program product comprising a computer readable storage medium having program instructions embodied therewith, the program instructions executable by a processor, located on a vehicle, can cause the processor to determine a proximity of a cyclist to the vehicle, wherein the cyclist is cycling on a road where the vehicle is parked; determine probability of dooring incident occurring in the event of an occupant of the vehicle opening a door to exit the vehicle when the cyclist is proximate to the vehicle; and in response to a first determination that the determined probability is above a probability threshold, generate a first instruction to prevent the occupant from exiting the vehicle until the determined probability is below the probability threshold.

In another embodiment, the program instructions are further executable by the processor to cause the processor to, in response to a second determination that the determined probability is below a probability threshold, generate a second instruction, wherein the second instruction causing unlocking of a door proximate to the occupant, enabling the occupant to exit the vehicle.

In an embodiment, the probability threshold can be determined based in part on at least one of: a determined age of the of the cyclist; a determined level of distraction of the cyclist; or a determined stability of the cyclist on a bicycle as cyclist approaches the vehicle.

An advantage of the one or more systems, computer-implemented methods, and/or computer program products can be utilizing various systems and technologies located on a vehicle (e.g., when parked) to identify the possibility of a dooring occurring, and in response to the determination, the vehicle preemptively changes operation to mitigate the chance of the dooring accident occurring. By identifying the potential of a dooring situation occurring the vehicle can take responsive action such temporarily preventing an occupant of the vehicle from opening a door into a path of a cyclist, thereby reducing the likelihood of the vehicle being involved in a cyclist/car dooring accident.

DESCRIPTION OF THE DRAWINGS

One or more embodiments are described below in the Detailed Description section with reference to the following drawings.

FIGS. 5A and 5B present images regarding determining a safe distance of operation of a bicycle relative to a vehicle, in accordance with an embodiment.

FIG. 6, presents an image illustrating a notification being presented, in accordance with an embodiment.

FIG. 7 presents a schematic illustrating a height of a cyclist being determined to enable determination of the age of cyclist, in accordance with an embodiment.

FIG. 10 is a schematic illustrating different rates at which a distance between a cyclist and a vehicle is covered as a function of the cyclist's velocity, in accordance with an embodiment.

FIG. 11 presents a schematic of a cyclist potentially having difficulty maintaining their balance, in accordance with an embodiment.

FIG. 13 presents a schematic illustrating inferences of a dooring incident and a corresponding action that can be taken, in accordance with an embodiment.

FIG. 17 illustrates a flow diagram for a computer-implemented methodology to determine a height H of a cyclist and adjust probabilities/threshold of a dooring incident and response thereto, in accordance with at least one embodiment.

FIG. 18 illustrates a flow diagram for a computer-implemented methodology to determine an age of a cyclist and adjust probabilities/threshold of a dooring incident and response thereto, in accordance with at least one embodiment.

FIG. 24 presents TABLE 2400 presenting a summary of SAE J3016 detailing respective functions and features during Levels 0-5 of driving automation (per June 2018).

DETAILED DESCRIPTION

Figure 1:
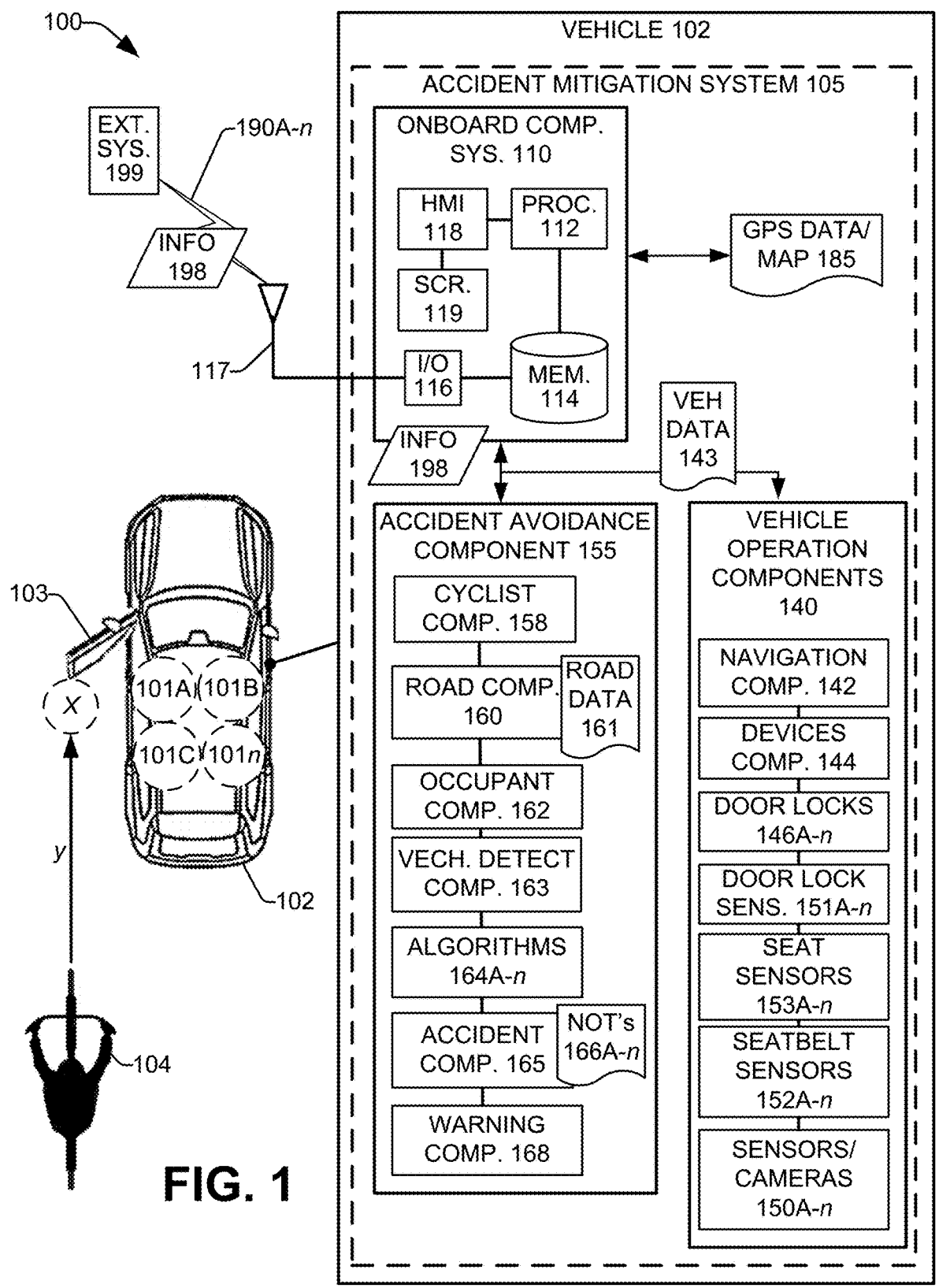
FIG. 1, is schematic of a system that can be located and utilized onboard a vehicle to reduce traffic accidents between the vehicle and cyclists, in accordance with one or more embodiments.

The following detailed description is merely illustrative and is not intended to limit embodiments and/or application or uses of embodiments. Furthermore, there is no intention to be bound by any expressed and/or implied information presented in any of the preceding Background section, Summary section, and/or in the Detailed Description section.

One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details.

It is to be understood that when an element is referred to as being "coupled" to another element, it can describe one or more different types of coupling including, but not limited to, chemical coupling, communicative coupling, electrical coupling, electromagnetic coupling, operative coupling, optical coupling, physical coupling, thermal coupling, and/or another type of coupling. Likewise, it is to be understood that when an element is referred to as being "connected" to another element, it can describe one or more different types of connecting including, but not limited to, electrical connecting, electromagnetic connecting, operative connecting, optical connecting, physical connecting, thermal connecting, and/or another type of connecting.

As used herein, "data" can comprise metadata. Further, ranges A-n are utilized herein to indicate a respective plurality of devices, components, signals etc., where n is any positive integer.

In the various embodiments presented herein, the disclosed subject matter can be directed to utilizing one or more components located on a vehicle being operated in any of a non-autonomous manner, a partially autonomous manner, a thorough to a fully autonomous manner. The one or more components can be utilized to reduce traffic accidents between vehicles and cyclists. Various systems and sensors onboard the vehicle, including one or more computer implemented algorithms (including vision algorithms), can be utilized to detect a presence of an occupant and their intent to exit the vehicle, e.g., by opening a door to egress the vehicle. As a function of the vehicle occupant intending to exit the vehicle, the various onboard systems and sensors can detect a cyclist navigating a road, bicycle lane, pavement, and suchlike, whereby the cyclist is cycling in the vicinity/towards/proximate to the vehicle, with the possibility of the occupant opening the vehicle door into the cyclist's path. Accordingly, the various onboard systems and sensors can determine/infer the likelihood/probability/possibility of a car dooring event occurring and further prevent the car dooring by controlling operation of the vehicle, such as preventing the car door from being opened until the cyclist has safely passed by the vehicle.

Various onboard sensors (e.g., seat sensor, seatbelt sensor, door handle/lock sensor, and suchlike) can be utilized to determine presence and intent of one or more occupants in the vehicle. The various onboard sensors and systems (e.g., using computer vision algorithms and suchlike) can be utilized to determine/predict a trajectory/velocity of the cyclist relative to the vehicle, e.g., cyclist is proximate, or soon to be proximate, to the vehicle.

In a non-limiting series of scenarios, the vehicle can (i) determine direction of the cyclist and the direction the vehicle is facing when parked, such that, if the car is parked facing towards the cyclist the chance of a dooring incident is reduced compared to (ii) a situation where the car is parked facing in the same direction as the cyclist is travelling.

The vehicle can be configured to gather information regarding the cyclist such as cyclist speed, cyclist height (e.g., adult, child), time until the cyclist will be at the vehicle with the door potentially ajar, a safe time for which a door can be opened prior to arrival of the cyclist, and suchlike. The vehicle systems can be further utilize onboard information regarding the dimension(s) of the vehicle, location of a door(s) on the vehicle, to enable a determination as to whether opening a door of the vehicle will place the door in the cyclist's path.

In an embodiment, time thresholds can be utilized to determine whether a dooring incident is likely, and further whether an occupant can exit the vehicle prior to the cyclist being proximate to the vehicle/door. For example, a threshold can be defined for the time it takes a person to exit a vehicle. Accordingly, whether the occupant is allowed to exit the vehicle or the door is temporarily locked can be based upon a determination of how long it will take for the cyclist to reach the car door. In response to a determination that the occupant has plenty of time to exit the vehicle (e.g., a low probability that a dooring event would occur if the door is opened), the occupant can be allowed to exit before the cyclist approaches the vehicle. In response to a determination that there is insufficient time for the occupant to exit the vehicle without a dooring event occurring (e.g., a high probability that a dooring event would occur if the door is opened), the vehicle door is temporarily locked until the cyclist has safely passed by the door, the door is subsequently unlocked and the occupant allowed to exit. The time duration used to establish the likelihood of a dooring incident can be adjusted based upon age, distraction, etc. Further, when the phrase dooring incident is used herein, the term also pertains to a cyclist colliding with the occupant as they exit the vehicle. Hence, the duration defined for the threshold should take into account the cyclist age, velocity, distractedness, etc., as well as the time it takes for the occupant to safely exit the vehicle.

In an embodiment, while the following relates to a vehicle being parked by the side of the road, the vehicle can be in any particular location, e.g., the vehicle is a taxi stopped in a traffic lane with hazard lights on.

Regarding the term "autonomous" operation, to enable the level of sophistication of operation of a vehicle to be defined across the industry by both suppliers and policymakers, standards are available to define the level of autonomous operation. For example, the International Standard J3016 *Taxonomy and Definitions for Terms Related to Driving Automation Systems for On-Road Motor Vehicles* has been developed by the Society of Automotive Engineers (SAE) and defines six levels of operation of a driving automation system(s) that performs part or all of the dynamic driving task (DDT) on a sustained basis. The six levels of definitions provided in SAE J3016 range from no driving automation (Level 0) to full driving automation (Level 5), in the context of vehicles and their operation on roadways. Levels 0-5 of SAE J3016 are summarized below and further presented in FIG. 24, Table 2400.

Level 0 (No Driving Automation): At Level 0, the vehicle is manually controlled with the automated control system (ACS) having no system capability, the driver provides the DDT regarding steering, braking, acceleration, negotiating traffic, and suchlike. One or more systems may be in place to help the driver, such as an emergency braking system (EBS), but given the EBS technically doesn't drive the vehicle, it does not qualify as automation. The majority of vehicles in current operation are Level 0 automation.

Level 1 (Driver Assistance/Driver Assisted Operation): This is the lowest level of automation. The vehicle features a single automated system for driver assistance, such as steering or acceleration (cruise control) but not both simultaneously. An example of a Level 1 system is adaptive cruise control (ACC), where the vehicle can be maintained at a safe distance behind a lead vehicle (e.g., operating in front of the vehicle operating with Level 1 automation) with the driver performing all other aspects of driving and has full responsibility for monitoring the road and taking over if the assistance system fails to act appropriately.

Level 2 (Partial Driving Automation/Partially Autonomous Operation): The vehicle can (e.g., via an advanced driver assistance system (ADAS)) steer, accelerate, and brake in certain circumstances, however, automation falls short of self-driving as tactical maneuvers such as responding to traffic signals or changing lanes can mainly be controlled by the driver, as does scanning for hazards, with the driver having the ability to take control of the vehicle at any time.

Level 3 (Conditional Driving Automation/Conditionally Autonomous Operation): The vehicle can control numerous aspects of operation (e.g., steering, acceleration, and suchlike), e.g., via monitoring the operational environment, but operation of the vehicle has human override. For example, the autonomous system can prompt a driver to intervene when a scenario is encountered that the onboard system cannot navigate (e.g., with an acceptable level of operational safety), accordingly, the driver must be available to take over operation of the vehicle at any time.

Level 4 (High Driving Automation/High Driving Operation): advancing on from Level 3 operation, while under Level 3 operation the driver must be available, with Level 4, the vehicle can operate without human input or oversight but only under select conditions defined by factors such as road type, geographic area, environments limiting top speed (e.g., urban environments), wherein such limited operation is also known as "geofencing". Under Level 4 operation, a human (e.g., driver) still has the option to manually override automated operation of the vehicle.

Level 5 (Full Driving Automation/Full Driving Operation): Level 5 vehicles do not require human attention for operation, with operation available on any road and/or any road condition that a human driver can navigate (or even beyond the navigation/driving capabilities of a human). Further, operation under Level 5 is not constrained by the geofencing limitations of operation under Level 4. In an embodiment, Level 5 vehicles may not even have steering wheels or acceleration/brake pedals. In an example of use, a destination is entered for the vehicle (e.g., by a passenger, by a supply manager where the vehicle is a delivery vehicle, and suchlike), wherein the vehicle self-controls navigation and operation of the vehicle to the destination.

To clarify, operations under levels 0-2 can require human interaction at all stages or some stages of a journey by a vehicle to a destination. Operations under levels 3-5 do not require human interaction to navigate the vehicle (except for under level 3 where the driver is required to take control in response to the vehicle not being able to safely navigate a road condition).

As referenced herein, DDT relates to various functions of operating a vehicle. DDT is concerned with the operational function(s) and tactical function(s) of vehicle operation, but may not be concerned with the strategic function. Operational function is concerned with controlling the vehicle motion, e.g., steering (lateral motion), and braking/acceleration (longitudinal motion). Tactical function (aka, object and event detection and response (OEDR)) relates to the navigational choices made during a journey to achieve the destination regarding detecting and responding to events and/or objects as needed, e.g., overtake vehicle ahead, take the next exit, follow the detour, and suchlike. Strategic function is concerned with the vehicle destination and the best way to get there, e.g., destination and way point planning. Regarding operational function, a Level 1 vehicle under SAE J3016 controls steering or braking/acceleration, while a Level 2 vehicle must control both steering and braking/acceleration. Autonomous operation of vehicles at Levels 3, 4, and 5 under SAE J3016 involves the vehicle having full control of the operational function and the tactical function. Level 2 operation may involve full control of the operational function and tactical function but the driver is available to take control of the tactical function.

Accordingly, the term "autonomous" as used herein regarding operation of a vehicle with or without a human available to assist the vehicle in self-operation during navigation to a destination, can relate to any of Levels 1-5. In an embodiment, for example, the terms "autonomous operation" or "autonomously" can relate to a vehicle operating at least with Level 2 operation, e.g., a minimum level of operation is Level 2: partially autonomous operation, per SAE J3016. Hence, while Level 2, partially autonomous operation, may be a minimum level of operation, higher levels of operation, e.g., Levels 3-5, are encompassed in operation of the vehicle at Level 2 operation. Similarly, a minimum Level 3 operation encompasses Levels 4-5 operation, and minimum Level 4 operation encompasses operation under Level 5 under SAE J3016.

It is to be appreciated that while the various embodiments presented herein are directed towards to one or more vehicles (e.g., vehicle 102) operating in an autonomous manner (e.g., as an autonomous vehicle (AV)), the various embodiments presented herein are not so limited and can be implemented with a group of vehicles operating in any of an autonomous manner (e.g., Level 5 of SAE J3016), a partially autonomous manner (e.g., Level 1 of SAE J3016 or higher), or in a non-autonomous manner (e.g., Level 0 of SAE J3016). For example, the vehicle can be operating in an autonomous manner (e.g., any of Levels 3-5), a partially autonomous manner (e.g., any of levels 1-2), or in a non-autonomous manner (e.g., Level 0).

Turning now to the drawings, FIG. 1 illustrates the concept of car dooring, whereby a cyclist 104 is cycling in direction y, an occupant 101 of vehicle 102 opens door 103, with the cyclist 104 colliding with the door 103 at location X.

FIG. 1, further illustrates a system 100 that can be located and utilized onboard a vehicle to reduce traffic accidents between the vehicle and cyclists, in accordance with one or more embodiments. System 100 comprises a vehicle 102 with an accident mitigation system (AMS) 105 located thereon, wherein vehicle 102 can be operating in any of a non-autonomous, partially autonomous, or fully autonomous manner (per FIG. 24). The AMS 105 can comprise various devices/components, such as an onboard computer system (OCS) 110, wherein the OCS 110 can be a vehicle control unit (VCU). The OCS 110 can be utilized to provide overall operational control and/or operation of vehicle 102.

In an embodiment, the OCS 110 can be configured to operate/control/monitor various vehicle operations, wherein the various operations can be further controlled by one or more vehicle operation components 140 communicatively coupled to the OCS 110. The various vehicle operation components 140 can include, in a non-limiting list, any of: a navigation component 142 configured to navigate vehicle 102 along a road as well as to control steering of the vehicle 102, e.g., in and out of a parking spot; and further, while not shown, the vehicle operation components 140 can further comprise an engine component configured to control operation, e.g., start/stop, of an engine/motor configured to propel the vehicle 102; an acceleration component configured to propel the vehicle 102; and a braking component configured to slow down or stop the vehicle 102; wherein the respective components can be utilized to drive/stop vehicle 102.

The vehicle operation components 140 can further include a devices component 144 configured to control/monitor operation of any onboard devices suitable to get the attention of cyclist 104, an occupant 101A-n of the vehicle 102, and the like. The onboard devices can include a device configured to generate an audible signal (e.g., a car horn on the vehicle 102, an audible message regarding "cyclist approaching", "door opening", "door temporarily closed", and suchlike) and/or a visual signal (e.g., hazard lights, headlights on the vehicle 102). In an embodiment, the vehicle operation components 140 and subcomponents can provide operational data/information 143 to the OCS 110 and other components incorporated into the AMS 105, wherein, for example, operational data/information 143 can include information regarding vehicle 102 is parking/parked, and suchlike. In an embodiment, onboard devices can include one or more doorlocks 146A-n, wherein the devices component 144 can control whether a door (e.g., door 103) on vehicle 102 can be opened, e.g., in response to a determination of a probability of a dooring incident occurring, wherein the one or more doorlocks 146A-n can be a locking mechanism configured to control operation of door(s) 103A-n.

The vehicle operation components 140 can further comprise various sensors and/or cameras 150A-n configured to monitor operation of vehicle 102 and further obtain imagery and other information regarding an environment/surroundings vehicle 102 is operating in. The sensors/cameras 150A-n can include any suitable detection/measuring device, including cameras, optical sensors, laser sensors, Light Detection and Ranging (LiDAR) sensors, sonar sensors, audiovisual sensors, perception sensors, road lane sensors, motion detectors, velocity sensors, and the like, as employed in such applications as simultaneous localization and mapping (SLAM), and other computer-based technologies and methods utilized to determine an environment being navigated by vehicle 102 and the location of the vehicle 102 within the environment (e.g., location mapping). Digital images, data, and the like generated by sensors/cameras 150A-n can be analyzed by algorithms 164A-n to identify respective features of interest such as a cyclist 104, other vehicles (e.g., parked in the vicinity of vehicle 102), lane markings (e.g., lane markers 240 and 250 further described herein), etc. In an embodiment, a camera 150A can capture visual data from the environment/surroundings, while a sensor 150B can operate based upon transmission of transmission and reflection of a signal (e.g., an infra-red (IR) signal), per detection beam(s) 420A-n, as further described herein.

The sensors and cameras 150A-n can further include various sensors, devices etc., that can be utilized to determine presence of an occupant 101A-n in a particular seat/location within vehicle 102, wherein the onboard devices can include, in a non-limiting list: (a) a door lock/handle sensor(s) 151A-n configured to determine whether an occupant 101A-n is attempting to open a vehicle door (e.g., door 103), (b) a seatbelt sensor(s) 152A-n configured to detect engagement of a seatbelt tongue with the seatbelt buckle, wherein the detected use of the seatbelt can be utilized to determine presence/location of an occupant 101A-n; (c) a seat sensor(s) 153A-n configured to determine presence/location of an occupant 101A-n (e.g., as a function of the occupant 101's mass), (d) an internal camera 150A or suchlike configured to record imagery from within the passenger compartment/cabin of vehicle 102, from which the presence and/or activity of the occupant 101A-n can be determined.

As shown, AMS 105 can further include an accident avoidance component (AAC) 155, wherein the AAC 155 can further comprise various components that can be utilized to mitigate an accident between the vehicle 102 and a cyclist 104. As shown in FIG. 1, the AAC 155 can be communicatively coupled to any subcomponent of AMS 105, the OCS 110, the vehicle operation components 140, and other components located on board vehicle 102.

A cyclist component 158 can be included in the AAC 155, wherein the cyclist component 158 can be configured to monitor and identify (aka determine/predict/infer) any of motion, a current and future location, a trajectory of motion, an action, age, height, attention/distraction, and suchlike, of the cyclist 104. The cyclist component 158 can be configured to receive information/data from the various on-board sensors and cameras 150A-n, as well as provided by algorithms 164A-n, and the like.

A road component 160 can be included in the AAC 155, wherein the road component 160 can analyze information (e.g., digital images, data) from various onboard sensors and cameras 150A-n to identify respective lane markings and suchlike, from which the road component 160 can generate road data 161 regarding a road being navigated by cyclist 104, being navigated by or proximate to vehicle 102 when parked, a pavement proximate to vehicle 102, etc. Accordingly, the road data 161 can include information regarding the width of the road, number of lanes forming the road, width of the lane(s), presence of a bike lane, width of a bicycle lane, presence of a parking lane, width of a parking lane, presence of a pavement/sidewalk, and the like. The road component 160 can further receive information from a GPS data/map system 185, wherein the GPS data/map system 185 can provide information to supplement the road data 161 (e.g., location of vehicle 102, number of lanes forming the road, width of the road, width of a lane(s), location of junctions/paths relative to vehicle 102, the road has a parking lane, and the like). Further, the road component 160 can receive road information from an external system 199 (e.g., a remote GPS system) providing further information regarding the road where the vehicle 102 is parked, which can further supplement road data 161.

The AAC 155 can further include an occupant component 162 configured to determine a presence and location of the one or more occupants 101A-n in the vehicle 102. In an embodiment, the presence and location of the one or more occupants 101A-n can be determined based on data received from any of the seat belt sensors 152A-n, the seat sensors 153A-n, and/or cameras/sensors 150A-n. The occupant component 162 can be further configured to determine a door 103A-n nearest to the occupant 101A-n based on which door lock/handle 151A-n a respective occupant is attempting to use to exit the vehicle 102. Hence, a determination can be made regarding whether the respective occupant 101A-n is attempting to exit via a door 103A-n opening to the sidewalk/pavement or to the road/bike-lane.

The AAC 155 can further include a vehicle detection component 163 which can be configured to identify and monitor operation (e.g., location, motion, direction) of another parked vehicle, e.g., to take into account the presence of the other parked vehicle when determining location of a cyclist 104. For example, the vehicle detection component 163 (e.g., via data generated by the sensors/cameras 150A-n) can detect presence of a parked vehicle and supplement information provided to the accident component 165 to enable the accident component 165 to further determine location/speed of a cyclist 104.

As mentioned, the AAC 155 can further comprise various algorithms 164A-n respectively configured/trained to determine information, make predictions, classify entities, etc., regarding any of the road being navigated; a velocity, location, movement and/or trajectory, etc., of a cyclist 104 navigating a road; location/operation of vehicle 102; location/activity of one or more occupants 101A-n in the vehicle 102; time it will potentially take a cyclist 104 to be within dooring distance of the vehicle 102; a safe time where door 103 can be opened prior to cyclist 104 being proximate to vehicle 102, a potential intersection (marked X on FIG. 1) of the trajectory of the cyclist 104 with the car door 103 of vehicle 102, and suchlike. Algorithms 164A-n can be configured to provide artificial intelligence (AI) to the various components onboard vehicle 102, and, in a non-limiting list, can include a computer vision algorithm(s), a digital imagery algorithm(s), position prediction, velocity prediction, direction prediction, and suchlike, to enable the respective determinations, predictions, etc., to be achieved, per the various embodiments presented herein. Algorithms 164A-n can be configured to provide determinations/information regarding cyclist 104 and any of head position, eye detection, detection of glasses being worn, body pose/posture, hand location relative to bicycle handlebars, height, age, face detection regarding age estimation of the cyclist, hand signals (e.g., indicating change in direction), riding stability on bicycle, and suchlike.

An accident component 165 can be further included in the AAC 155, wherein the accident component 165 can be configured to infer/determine likelihood/probability of cyclist 104 colliding with door 103, a likelihood of collision/dooring, a location of collision (e.g., at location X on FIG. 1), and suchlike. As shown in FIG. 1, the accident component 165 can be configured to analyze the wealth of information generated regarding cyclist 104 (e.g., their speed and motion, trajectory y, age/distractedness, and suchlike) and the vehicle 102 (e.g., location/activity of occupants 101A-n, parked location, and suchlike). The accident component 165 can be configured to generate and transmit one or more notifications 166A-n regarding a respective likelihood of an accident occurring between the cyclist 104 and the vehicle 102/door 103.

The AAC 155 can further include a warning component 168. The warning component 168 can be configured to operate in conjunction with the accident component 165, wherein the warning component 168 can receive a notification 166A from the accident component 165 that a moderate/high likelihood of collision exists between the cyclist 104 and the vehicle 102/door 103. In response to receiving the notification 166A, the warning component 168 can interact with the devices component 144 to initiate operation of the headlights, hazard lights, car horn, etc., to obtain the attention of the cyclist 104 and/or occupant(s) 101A-n of vehicle 102. The warning component 168 can be further configured to generate a warning/notification for presentment to an occupant(s) 101A-n of vehicle 102 regarding an operation of vehicle 102 (e.g., door 103 is temporarily locked).

It is to be appreciated that while FIG. 1 presents accident component 165 generating/transmitting notifications 166A-n, any of the components included in the AMS 105 can generate and transmit notifications 166A-n to one or more other components included in the AMS 105. Further, the notifications 166A-n can include information beyond notifications, wherein the notifications 166A-n can include instructions (e.g., a first component instructs a second component to perform an action), warnings, and suchlike.

As shown in FIG. 1, the OCS 110 can further include a processor 112 and a memory 114, wherein the processor 112 can execute the various computer-executable components, functions, operations, etc., presented herein. The memory 114 can be utilized to store the various computer-executable components, functions, code, etc., as well as road data 161, algorithms 164A-n, notifications 166A-n, information (e.g., motion, trajectory) regarding cyclist 104, information (e.g., location, parked direction, motion, trajectory, door 103 operation) regarding vehicle 102, and suchlike (as further described herein). In an embodiment, the vehicle operation components 140 can form a standalone component communicatively coupled to the OCS 110, and while not shown, the vehicle operation components 140 can operate in conjunction with a processor (e.g., functionally comparable to processor 112) and a memory (e.g., functionally comparable to memory 114) to enable navigation, steering, braking/acceleration, etc., of vehicle 102 to a parking spot, as well as operation of onboard systems/devices to mitigate a dooring incident. In another embodiment, the vehicle operation components 140 can operate in conjunction with the processor 112 and memory 114 of the OCS 110, wherein the various control functions (e.g., navigation, steering, braking/acceleration, door operation, detection of cyclist 104) can be controlled by the OCS 110. Similarly, the AAC 155 can form a standalone component communicatively coupled to the OCS 110, and while not shown, the AAC 155 can operate in conjunction with a processor (e.g., functionally comparable to processor 112) and a memory (e.g., functionally comparable to memory 114) to enable car dooring determination, e.g., during operation of vehicle 102. In another embodiment, the AAC 155 can operate in conjunction with the processor 112 and memory 114 of the OCS 110, wherein the various accident detection functions can be controlled by the OCS 110. In a further embodiment, the OCS 110, vehicle operation components 140, and the AAC 155 (and respective sub-components) can operate using a common processor (e.g., processor 112) and memory (e.g., memory 114).

As further shown, the OCS 110 can include an input/output (I/O) component 116, wherein the I/O component 116 can be a transceiver configured to enable transmission/receipt of information 198 (e.g., a warning notification 166A-n, road data 161, and the like) between the OCS 110 and any external system(s) (e.g., external system 199), e.g., a cellphone, a GPS data system, a computer-based system, and suchlike. I/O component 116 can be communicatively coupled, via an antenna 117, to the remotely located devices and systems (e.g., external system 199). Transmission of data and information between the vehicle 102 (e.g., via antenna 117 and I/O component 116) and the remotely located devices and systems can be via the signals 190A-n. Any suitable technology can be utilized to enable the various embodiments presented herein, regarding transmission and receiving of signals 190A-n. Suitable technologies include BLUETOOTH®, cellular technology (e.g., 3G, 4G, 5G), internet technology, ethernet technology, ultra-wideband (UWB), DECAWAVE®, IEEE 802.15.4a standard-based technology, Wi-Fi technology, Radio Frequency Identification (RFID), Near Field Communication (NFC) radio technology, and the like.

In an embodiment, the OCS 110 can further include a human-machine interface (HMI) 118 (e.g., a display, a graphical-user interface (GUI)) which can be configured to present various information including imagery of/information regarding cyclist 104, components of vehicle 102, notification regarding temporary prevention of door 103 from being opened, the road, alarms, warnings, information received from onboard and external systems and devices, etc., per the various embodiments presented herein. The HMI 118 can include an interactive display 119 to present the various information via various screens presented thereon, and further configured to facilitate input of information/settings/etc., regarding operation of the vehicle 102. Operation of the warning component 168 and notifications 166A-n can be utilized to present a warning on the HMI 118 and screen 119 to notify the occupant 101 of vehicle 102 of the possible collision between the cyclist 104 and the vehicle 102, operation of door 103 being temporarily locked, etc.

Figure 2A:
FIGS. 2A-2C present images illustrating respective situations involving dooring-based events.
Figure 2B:
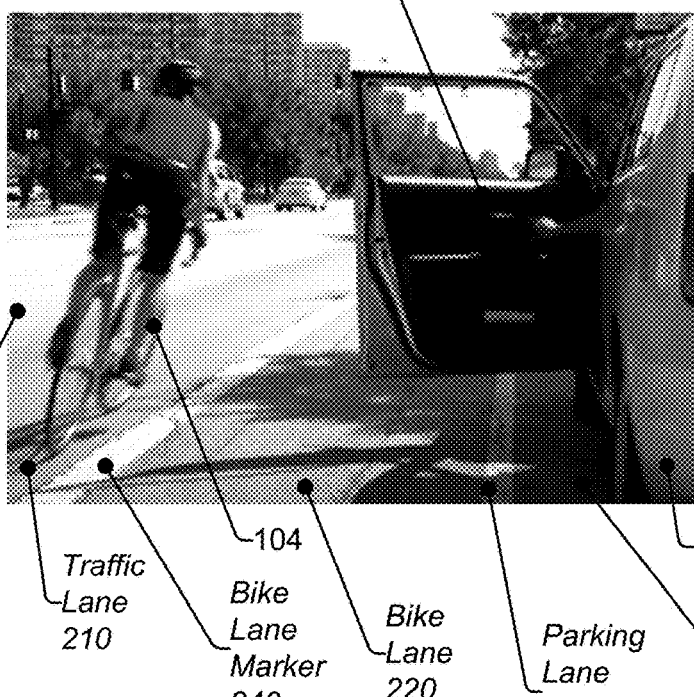
Figure 2C:
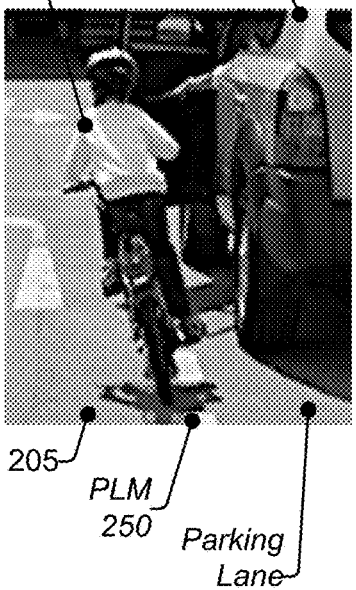

Turning to FIGS. 2A-2C, images 200A-C illustrate respective situations involving dooring-based events. FIG. 2A illustrates a situation where a cyclist 104 is falling into road 205 after colliding with an open door 103 of vehicle 102 that was opened in the path of cyclist 104. FIG. 2B illustrates a situation where a cyclist 104 is avoiding a vehicle door 103 being opened by a driver/occupant 101A-n of vehicle 102. As illustrated, vehicle 102 is parked in the parking lane 230, and the cyclist 104 was initially riding along the bike lane 220, wherein the bike lane 220 and the parking lane 230 are present on the road 205 and are separated by the parking lane marker 250 (e.g., a painted line on the road surface that extends along the length of the parking lane 230). To avoid colliding with the door 103, the cyclist 104 has moved out of the bike lane 220 and into the traffic lane 210, wherein the bike lane 220 and the traffic lane 210 are present on the road 205 and are separated by the bike lane marker 240 (e.g., a painted line on the road surface that extends along the length of the bike lane 220). Once the door 103 has been avoided, the cyclist 104 can return to the bike lane 220 to continue their journey. FIG. 2C illustrates a situation where the cyclist 104 is a child/short stature, whereby the possibility of an occupant 101A-n of vehicle 102 seeing the child cyclist 104 is reduced owing to the height of the child cyclist 104 relative to a window of vehicle 102.

In an embodiment, the various lane markings (e.g., bike lane marker 240 and parking lane marker 250 depicted in FIG. 2B) and kerb/curb structures (not shown) can be marked on a road surface utilizing lane markings such as white and/or yellow painted stripes, where the stripes can be a continuous line or a broken/dashed pattern. Lane markings can also be indicated by other techniques, such as white stones, rumble strips, reflective beads or surfaces located on or in a road surface, such as reflective studs colloquially termed "cat's eyes", and such like.

Figure 3:
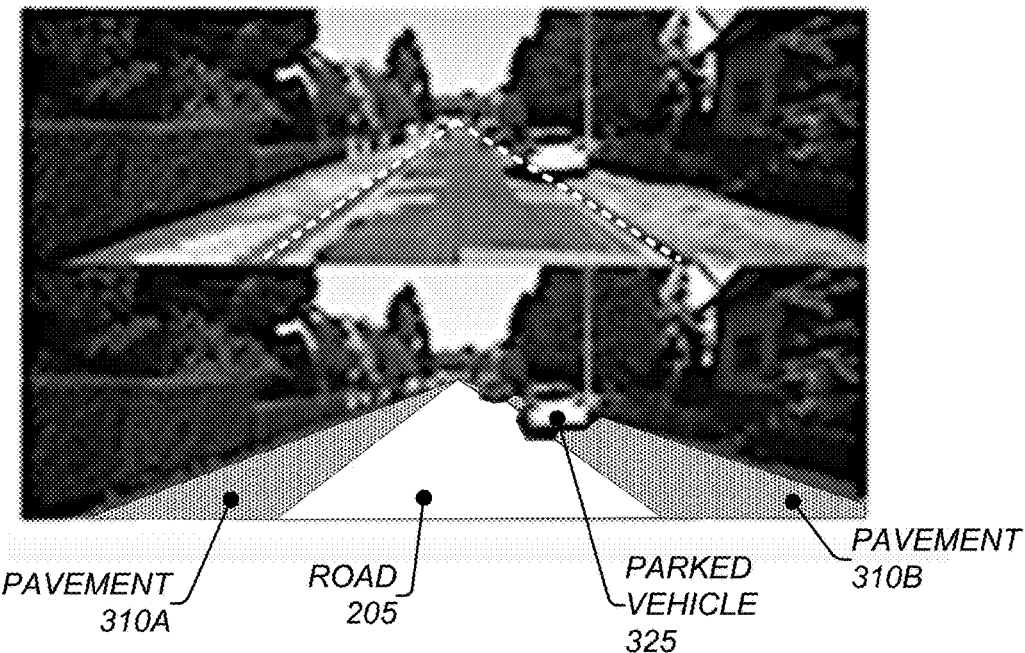
FIG. 3, presents a digital image of a road being analyzed with various regions and objects being identified, according to an embodiment.

FIG. 3, image 300 presents a digital image of a road being analyzed with various regions and objects being identified, according to an embodiment. As shown in FIG. 3, the road component 160 (e.g., in conjunction with onboard sensors/cameras 150A-n, a computer vision algorithm 164A, and suchlike) can be configured to compile road data 161 regarding the presence of a road 205, pavements 310A and 310B, a parked vehicle 325, and suchlike, wherein further details can be generated regarding lane markings (e.g., lane markings 240 and 250), kerb/curb structures, and suchlike, as well as the presence/motion of the cyclist 104, the location/movement of the vehicle 102, and the location of the door 103 and whether it is being opened, and suchlike.

Figure 4:
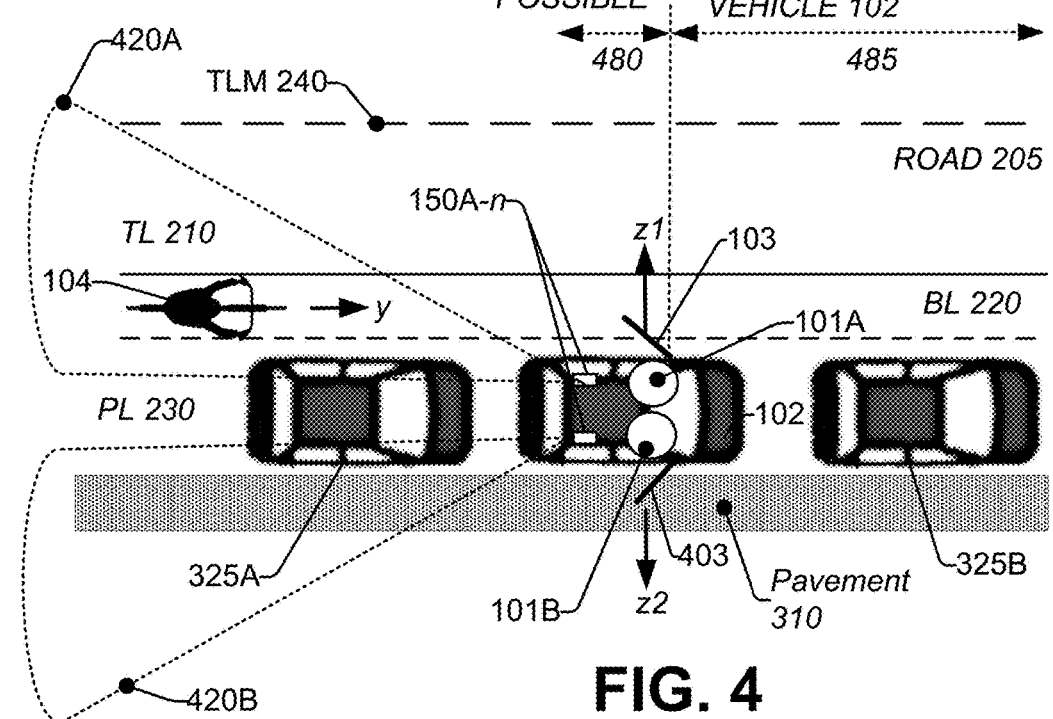
FIG. 4, schematic illustrates a scenario of application for the various embodiments presented herein regarding mitigating/preventing car dooring incidents.

FIG. 4, schematic 400, illustrates a scenario of application for the various embodiments presented herein regarding mitigating/preventing car dooring incidents. FIG. 4 illustrates a road 205 comprising three lanes: traffic lane 210, bike lane 220, and a parking lane 230, wherein a group of vehicles 325A-n are respectively parked in the parking lane 230 between a pavement/sidewalk 310 and the parking lane marker 250. A vehicle 102, with two occupants 101A and 101B, has navigated into a parking space between parked vehicles 325A and 325B, wherein the parking space is adjacent to the pavement 310. As previously mentioned, the vehicle 102 can be operating non-autonomously, semi-autonomously, or in full autonomous mode. A cyclist 104 is cycling along the bike lane 220 in direction y towards vehicle 102. A line d positioned relative to the position of door 103 acts a demarcation between where a dooring incident is possible and where a dooring incident is not possible. Given that vehicle 102 is parked facing direction y, and owing to how door 103 opens, a dooring incident is possible in the region 480 of bike lane 220 prior to the door 103. However, a dooring incident is not possible with vehicle 102 once the cyclist 104 has passed the region of door 103 (per line d) and entered region 485. Accordingly, the various components of AMS 105 are utilized to prevent a dooring incident as the cyclist 104 is advancing towards and/or is proximate to vehicle 102/door 103, e.g., occupant 101A is temporarily prevented from opening door 103. Once the cyclist 104 has passed the vehicle 102/door 103, the AMS 105 can allow the occupant 101A to open door 103 and exit vehicle 102, e.g., in direction z1.

It is to be appreciated that the scenario presented in FIG. 4 is only one of many scenarios that can be encountered. For example, vehicle 102 may be designed with doors that open from a hinge located at the rear of the door, also known as "suicide doors", and accordingly, the respective zones 480 and 485 would be reversed, with a cyclist 104 moving towards a suicide door from direction-y being in danger of involvement in a dooring incident. Further, in the event that vehicle 102 parked facing the opposite direction, e.g., facing vehicle 325A, then the respective zones 480 and 485 would be reversed with a cyclist 104 approaching vehicle 102 from a direction-y being in danger of involvement in a dooring incident. In an embodiment, navigation component 142 can be utilized to provide information to the accident component 165 regarding the direction in which vehicle 102 is facing when parked (e.g., from internal sensors, GPS information, and suchlike).

As shown, the onboard cameras/sensors 150A-n are active and determining any of the presence/motion of the cyclist 104 relative to the road 205, the location of other parked vehicles 325A-n, the location of parked vehicle 102, location/operation of door 103, e.g., based upon light detection (e.g., by a camera 150A), IR return signaling (e.g., by an IR sensor 150B) and suchlike, as indicated by field of view/detection beam 420A.

The AMS 105 (e.g., accident component 165 operating in conjunction with the cyclist component 158, the road component 160, the vehicle detection component 163, algorithms 164A-n, data from sensors 150A-n, and suchlike) can be configured to (i) determine the presence/motion of the cyclist 104 in the bike lane 220, and (ii) further determine/infer a likelihood of a dooring incident occurring in the event of an occupant (e.g., any of occupants 101A-n) exiting vehicle 102 when the cyclist 104 is approaching/proximate to the vehicle 102.

As further shown in FIG. 4, occupant 101B is located in the passenger-side front seat, and can exit the vehicle 102 onto the pavement 310, e.g., in direction z2 via door 403. Similar to the field of view/detection beam 420A, a field of view/detection beam 420B can be generated by sensors/cameras 150A-n such that a cyclist 104 riding on the pavement 310 can also be detected. In response to determining that a cyclist 104 (or a pedestrian) is present on the pavement 310 and is advancing towards vehicle 102, with an according determination (e.g., by accident component 165) that a dooring incident could occur with door 403, the accident component 165/AMS 105 can temporarily prevent the occupant 101B from opening the door 403 until cyclist 104 has passed. Alternatively, in response to determining that a cyclist 104 (or a pedestrian) is not present on the pavement 310, or is present but there is no risk of dooring, with an according determination (e.g., by accident component 165) that a dooring incident likely will not occur, occupant 101B can open door 403 and exit vehicle 102.

In an embodiment, the initiation of determining whether a dooring incident exists can be initiated when vehicle 102 is being parked. For example, as vehicle 102 is determined to be being parked (e.g., by road component 160 operating in conjunction with cameras 150A-n and image algorithms 164A-n), the occupant component 162 can determine the number of occupants 101A-n and their respective location in vehicle 102, and based thereon, the occupant component 162 can monitor activity of the occupant(s) 101A-n and provide according information to the accident component 165 to enable the accident component 165 to make respective inferences and determinations regarding probability of a dooring incident and its location (e.g., in road or on pavement).

Turning to FIGS. 5A and 5B, images 500A-B present determining a safe distance of operation of a bicycle relative to a vehicle, in accordance with an embodiment. Per FIG. 5A, accident component 165 can be supplied with knowledge (e.g., pre-defined in accident component 165) regarding the respective length of the doors (e.g., doors 103, 403), and hence can determine a safe distance dL for which the cyclist 104 needs to be positioned beyond to avoid colliding with a door 103. For example, the accident component 165 is programmed with a pre-configured length dL of 1 metre (3 feet). As shown in FIG. 5B, a determination can be made that vehicle 102 is only parked 0.3 metres (distance dw) away from the parking lane marker 250, and further cyclist 104 is only 0.2 metres (distance cL) into the bike lane 220, such that dL=1, dw=0.3, cL=0.2, then:

If dw+cL>dL, then safe z distance exists, or
If dw+cL<dL, then safe z distance does not exist.
0.3+0.2<1.0, hence the safe distance in the z direction is determined to be insufficient (e.g., by accident component 165), a dooring event is likely, and door 103 should be temporarily prevented from opening.

Turning to FIG. 6, image 600 illustrates a notification being presented, in accordance with an embodiment. As previously mentioned, in the event of a determination of a dooring incident between a cyclist 104 and vehicle 102 being likely, opening of door 103 can be temporarily prevented (e.g., operation of door lock 146 is temporarily halted). To prevent an occupant 101A wondering as to why a door unexpectedly will not open, a visual notification 610 can be presented on a screen 119 to inform the occupant 101A that the door is temporarily locked while a cyclist 104 is passing by. Notification 610 can be presented in response to a notification 166A-n being generated by the accident component 165 and received at the HMI 118. While the notification 610 is shown to be a visual notification, other notifications can be generated by any suitable technique, e.g., a light, audible signal/announcement, and suchlike, e.g., generated in response to receipt of notification 166A-n. Once the cyclist 104 has cycled by vehicle 102, presentment of the notification 610 can be discontinued and the door (e.g., door 103, 403) can be opened. The screen 119 and notification 610 can be located anywhere in vehicle 102, e.g., above the steering wheel console, a centrally mounted dashboard console/display, a display located on the back of a car seat for occupants 101A-n located in the rear, projected onto a window/windshield of vehicle 102, and suchlike.

FIG. 7, schematic 700, illustrates height of a cyclist being determined to enable determination of the age of cyclist, in accordance with an embodiment. As show in FIG. 7, the cyclist component 158 can be configured to determine the height of cyclist 104, and based thereon, can further determine the approximate age of the cyclist 104, e.g., is cyclist 104 an adult or a child? Further, cyclist component 158 can determine a posture of cyclist 104, per algorithms 164A-n. Based on signals in detection beam 420 (e.g., as received by sensors 150A-n and processed by algorithms 164A-n) the cyclist component 158 can determine the following:

J=distance from saddle of bicycle 710 being ridden to head/helmet of the cyclist 104.
K=distance from saddle of bicycle 710 being ridden by cyclist 104 to the highest pedal point of the bicycle.
L=distance from saddle of bicycle 710 being ridden by cyclist 104 to the lowest pedal point of the bicycle.
H=J+L=height of cyclist 104, wherein the measurements generated by the cyclist component 158 can take into account the poise of the cyclist 104 (e.g., algorithms 164A-n can include a body pose estimator) while riding the bicycle 710.

In the event of determining, for example, H≤150 cm (60"), the cyclist component 158 can be configured to infer cyclist 104 as being a child. In the event of determining H>150 cm, the cyclist component 158 can be configured to infer cyclist 104 as being an adult. Any value can be predefined for H in the cyclist component 158. Accordingly, in the event of the cyclist 104 being determined to be a child, a relative time for which a door 103 is temporarily locked can be extended (e.g., by accident component 165 and door lock 146) compared to a locking duration of door 103 when cyclist 104 is an adult, and further, the respective levels of distracted (per TABLE 1) can be further tightened to account for the distractedness/vulnerability of the child, e.g., moderately distracted becomes highly distracted.

Figure 8:
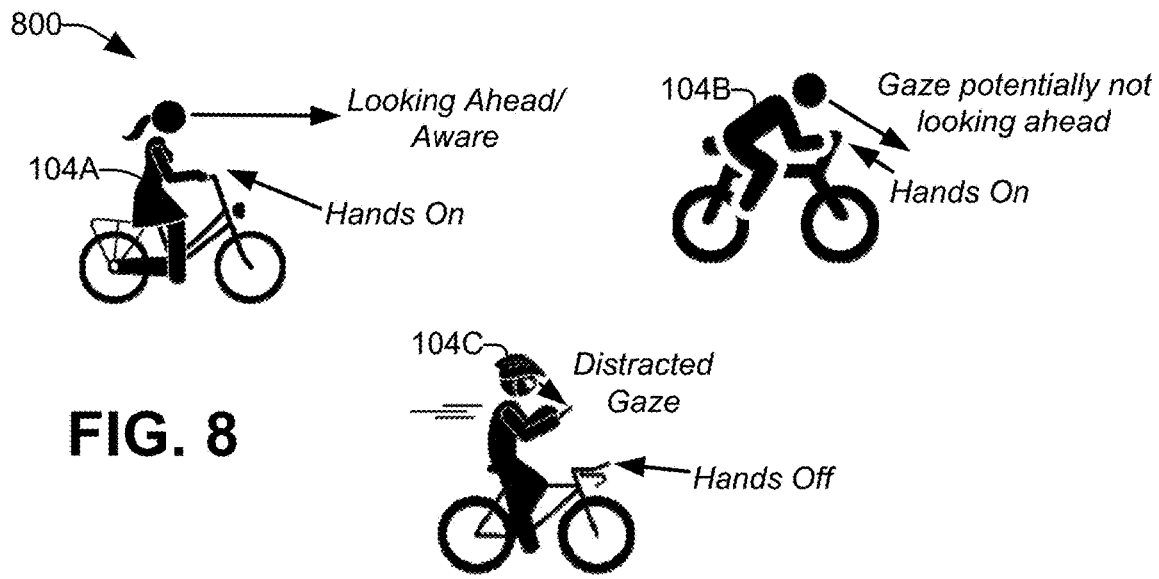
FIG. 8 presents various images depicting a cyclist's engagement with their surroundings, according to an embodiment.

As well as the age of cyclist 104 being a concern, the level of engagement the cyclist 104 has with the surroundings can also be of concern. The more distracted the cyclist 104, the greater the possibility that they are not paying attention to vehicle 102 and other vehicles 325A-n. FIG. 8, schematic 800, presents various images depicting a cyclist's engagement with their surroundings, according to an embodiment. The cyclist component 158 in conjunction with cameras/sensors 150A-n, and algorithms 164A-n can be utilized to determine (e.g., by accident component 165) how engaged the cyclist 104 is with their surroundings and adjust operation of the vehicle 102 accordingly. Depending upon a determined (e.g., by accident component 165, cyclist component 158, etc.) amount of time (safe time) that it will take cyclist 104 to reach vehicle 102, an occupant 101A-n may have sufficient time to be able to exit vehicle 102, and accordingly, be noticed by cyclist 104. However, owing to cyclist 104 being distracted or not looking in a potential location of an occupant 101 as they exit a vehicle, the safe time can be adjusted accordingly (e.g., by accident component 165).

Per FIG. 8, cyclist 104A is looking at the road ahead, with their height assessed as being an adult who is holding the handlebars to steer the bicycle 710. Based on such information, the accident component 165 can infer with a high degree of confidence that the cyclist 104A is engaged with their surroundings, they are not distracted, and a dooring incident is improbable/has a low level of probability.

Per FIG. 8, cyclist 104B is peddling in an energetic manner/racing posture and while the cyclist 104B may have their hands on the handlebars controlling the direction of the bicycle 710, the racing position naturally positions cyclist 104's head to be facing/looking at a portion of the road proximate to them rather than much further ahead. Accordingly, the cyclist 104B may not be aware of the presence of vehicle 102 and/or an occupant 101A-n present in the vehicle 102, or exiting vehicle 102. Based on such information, the accident component 165 can infer with a moderate degree of confidence that that while cyclist 104A is actively engaged in the steering and operation of the bicycle 710, a dooring incident is moderately probable.

Per FIG. 8, cyclist 104C is viewing a portable device, e.g., a cellphone, tablet computer, and suchlike, and is also riding the bicycle 710 in a "hands free" manner. The accident component 165 can infer with a high degree of confidence that cyclist 104C is not engaged with their surroundings, is cycling in a distracted manner, and a dooring incident is highly probable.

TABLE 1 provides a summary of the foregoing examples presented in FIG. 8, as well as a determination as to whether the cyclist 104A-C is distracted and a degree of confidence in the determination/inference, e.g., by accident component 165.

TABLE 1

SCENARIOS & RELATIVE PROBABILITIES OF A CYCLIST BEING DISTRACTED/AWARE OF PRESENCE OF VEHICLE 102.

| | EYES/ GLASSES | HEAD DOWN/ FWD | ARMS ON HANDLE BARS | DISTRACTED | DEGREE OF CONFIDENCE |
|---|---|---|---|---|---|
| CYCLIST 104A | Both Detected | Forward | Yes | No, cyclist is Focused | High |
| CYCLIST 104B | Eyes Not detected/ glasses may/ may not be | Down | Yes | No - but may not see vehicle 102 | Moderate |
| CYCLIST 104C | Eyes Not detected/glasses not directed towards vehicle | Down | No | Yes, cyclist is distracted | High |

Other parameters/information that can be compiled regarding a cyclist 104 (e.g., by cyclist component 158) and their cycling activity, and ultimately, a probability (e.g., as determined by accident component 165) of a dooring incident occurring and/or safe time duration, can include, in a non-limiting list: eye/iris detection algorithms 164A-n can be utilized to determine the direction of a cyclist's 104 focus of attention as a function of where they cyclist 104 is looking. Face detection algorithms 164A-n can also be utilized to determine whether a person is wearing glasses, and if so, the direction of their gaze/field of view with regard to the position of the glasses and the head of the cyclist 104. Face analysis algorithms 164A-n can also be utilized to determine the age of the cyclist 104. As a person ages, their sight and hearing may decrease with an according required increase in response/reaction times, and further, an older person is more likely to be severely injured in a dooring incident than a young adult, for example. Accordingly, the face analysis can be utilized to determine a direction of gaze of the cyclist 104, and response to determining cyclist 104 is an older person, the duration that door 103 remains locked can be increased compared with the locked duration for a younger person.

Figure 9:
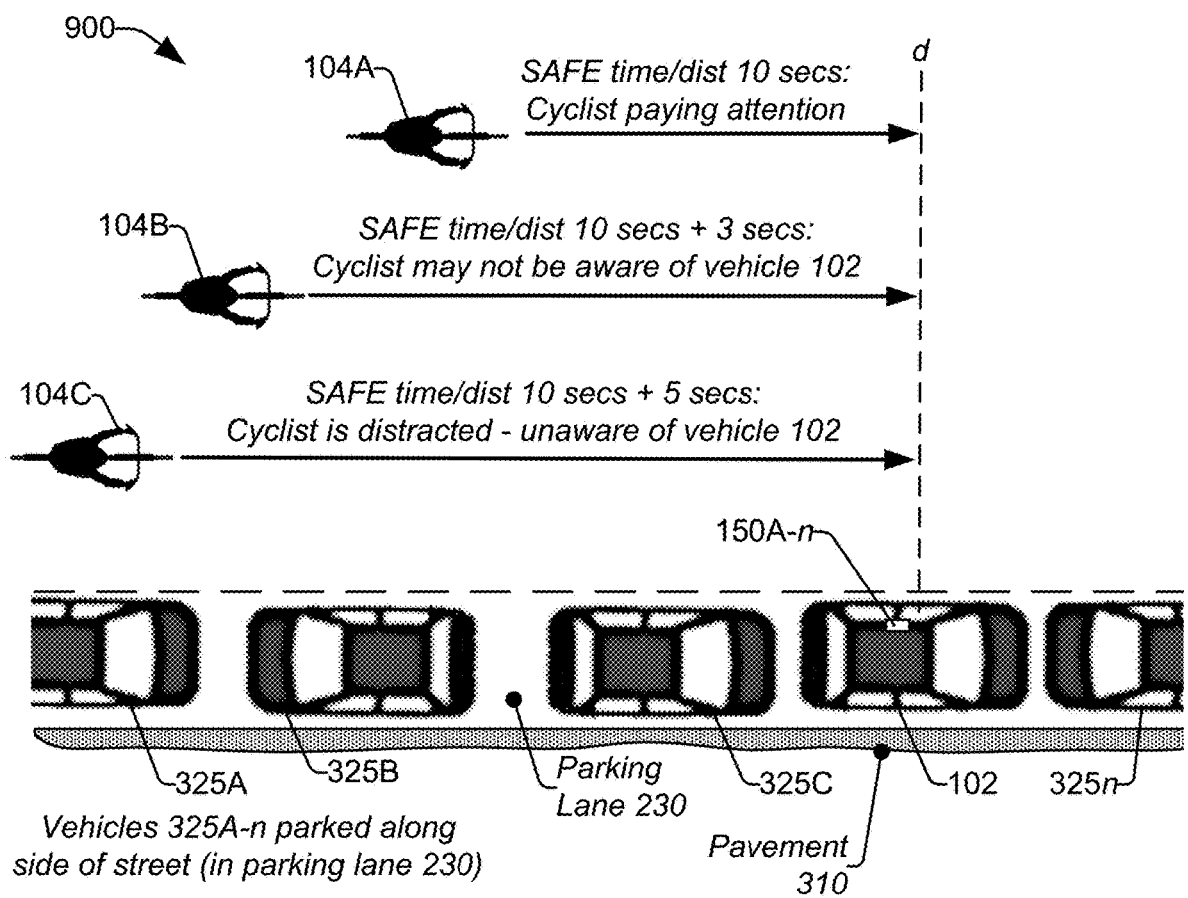
FIG. 9 is a schematic presenting various safe time and/or safe distance scenarios, in accordance with an embodiment.

Per the respective scenarios presented in FIG. 8, different safe times and/or safe distances can be generated to prevent any of the cyclists 104A-C from colliding with the vehicle 102. FIG. 9, schematic 900 presents various safe time and/or safe distance scenarios, in accordance with an embodiment. Per the foregoing, cyclist 104A is an adult cycling in a manner engaged with their surroundings. Hence, at given velocity V, a safe time of 10 seconds can be determined by accident component 165 to be the safe time to avoid dooring, wherein given cyclist 104A's attention they will likely see vehicle 102 within 10 seconds, as well as being at the vehicle 102 within 10 seconds. Accordingly, the door 103 can be kept temporarily locked for the 10 seconds that it takes for the cyclist 104A to cycle past the vehicle 102 or door 103 is opened for a short period of time to enable an occupant to exit vehicle 102, wherein door 103 is subsequently temporarily locked as cyclist 104A becomes proximate to vehicle 102.

As mentioned, cyclist 104B is an adult cycling with a manner such that they may not be aware of vehicle 102. Hence, at given velocity V, a safe time of 13 seconds (10+3 extra seconds) can be determined by accident component 165 to be duration prior to a dooring event potentially occurring, e.g., cyclist 104 may need the extra 3 seconds to look up and see vehicle 102 or occupant 101A exiting. Accordingly, the door 103 can be kept temporarily locked for the 13 seconds that it takes for the cyclist 104B to cycle past the vehicle 102 or door 103 is opened for a short period of time to enable an occupant to exit vehicle 102, wherein door 103 is subsequently temporarily locked as cyclist 104B becomes proximate to vehicle 102.

Further, per FIGS. 8 and 9, cyclist 104C is an adult cycling in a distracted manner such that they likely are not aware of vehicle 102. Hence, at given velocity V, a safe time of 15 seconds (10+5 extra seconds) can be determined by accident component 165 to be duration prior to a dooring event potentially occurring that cyclist 104 may need to become aware of vehicle 102. Accordingly, the door 103 can be kept temporarily locked for the 15 seconds that it takes for the cyclist 104B to cycle past the vehicle 102 or door 103 is opened for a short period of time to enable an occupant to exit vehicle 102, wherein door 103 is subsequently temporarily locked as cyclist 104B becomes proximate to vehicle 102. The various safe times presented here can be included into the threshold durations, as further described in FIG. 13, e.g., the standard threshold value is adjusted (e.g., by accident component 165) to incorporate the determined safe times.

In another embodiment, an occupant 101 may have exited vehicle 102 (e.g., during a safe time period, or prior to cyclist 104 being within visual range of cameras 150A-n, or cyclist 104 is at a distance that a dooring incident is determined as being unlikely, and suchlike) but neglected to close door 103 (e.g., occupant 101 is distracted removing shopping/groceries, on phone, by children, negligent, etc.), and a door incident can have a high probability of occurring, particularly if the cyclist 104 is also distracted. However, where cyclist 104 is focused and not distracted, the actions of the occupant 101 can be reduced as cyclist 104 may have sufficient time to brake and/or avoid open door 103.

Other parameters that can be considered are the velocity of the cyclist 104 riding towards vehicle 102 and time required to navigate a particular distance. FIG. 10, schematic 1000, illustrates different rates at which a distance between a cyclist and a vehicle is covered as a function of the cyclist's velocity, in accordance with an embodiment. As shown in FIG. 10, an adult cyclist 104A might cover a particular distance to position d at a vehicle 102 in 5 seconds, while a child cyclist 104B might take 8 seconds to cover the same distance. In another aspect, an adult cyclist 104C may cover a particular distance in 5 seconds when cycling at 12 km/h (7.5 mph), while another adult cyclist 104D may cover a much further distance in 5 seconds when traveling at 22 km/h (13.5 mph). The various distances and durations to navigate a distance at a particular velocity can be utilized by the accident component 165 to determine the probability of a dooring incident occurring, e.g., at position X of FIG. 1, a value of duration for which the threshold should be set, and any available safe time for an occupant 101 to exit prior to cyclist 104 being proximate to the occupant 101 and/or door 103.

Another parameter that can be considered is the direction/stability of the cyclist 104. Per FIG. 11, image 1100 presents a schematic of a cyclist potentially having difficulty maintaining their balance, in accordance with an embodiment. Image analysis (e.g., by accident component 165/algorithms 164A-n) of the digital imagery captured (e.g., by cameras 150A-n) as the cyclist 104 is cycling towards vehicle 102 indicates the cyclist 104 may be a child who is still not fully proficient on riding/steering a bicycle (e.g., still learning to ride bicycle 710), or the cyclist 104 may be swerving as a result of instability arising from being drunk/intoxicated. As shown in FIG. 11, trajectory 1110 of cyclist 104's motion is erratic/swerving, varying in direction z. Based on determining that cyclist 104 is swerving, the time for which the door 103 remains temporarily locked can be extended (e.g., the duration of the threshold is increased) to enable the cyclist 104 to pass, or in the event that owing to the swerving the cyclist 104 is going to take an extended time to reach vehicle 102, a determination can be made (e.g., by accident component 165) that sufficient safe time exists such that the door 103 can be opened to enable the occupant 101 to exit prior to cyclist 104 being proximate to vehicle 102. The degree of variation in direction z of trajectory 1110 (e.g., relative to parking lane marking 250, bike lane marking 240, vehicle 102) can be utilized in the determination(s) conveyed in FIGS. 5A and 5B, to determine a position of cyclist 104 relative to distance dL in determining (e.g., by accident component 165) whether a dooring incident may occur.

Figure 12:
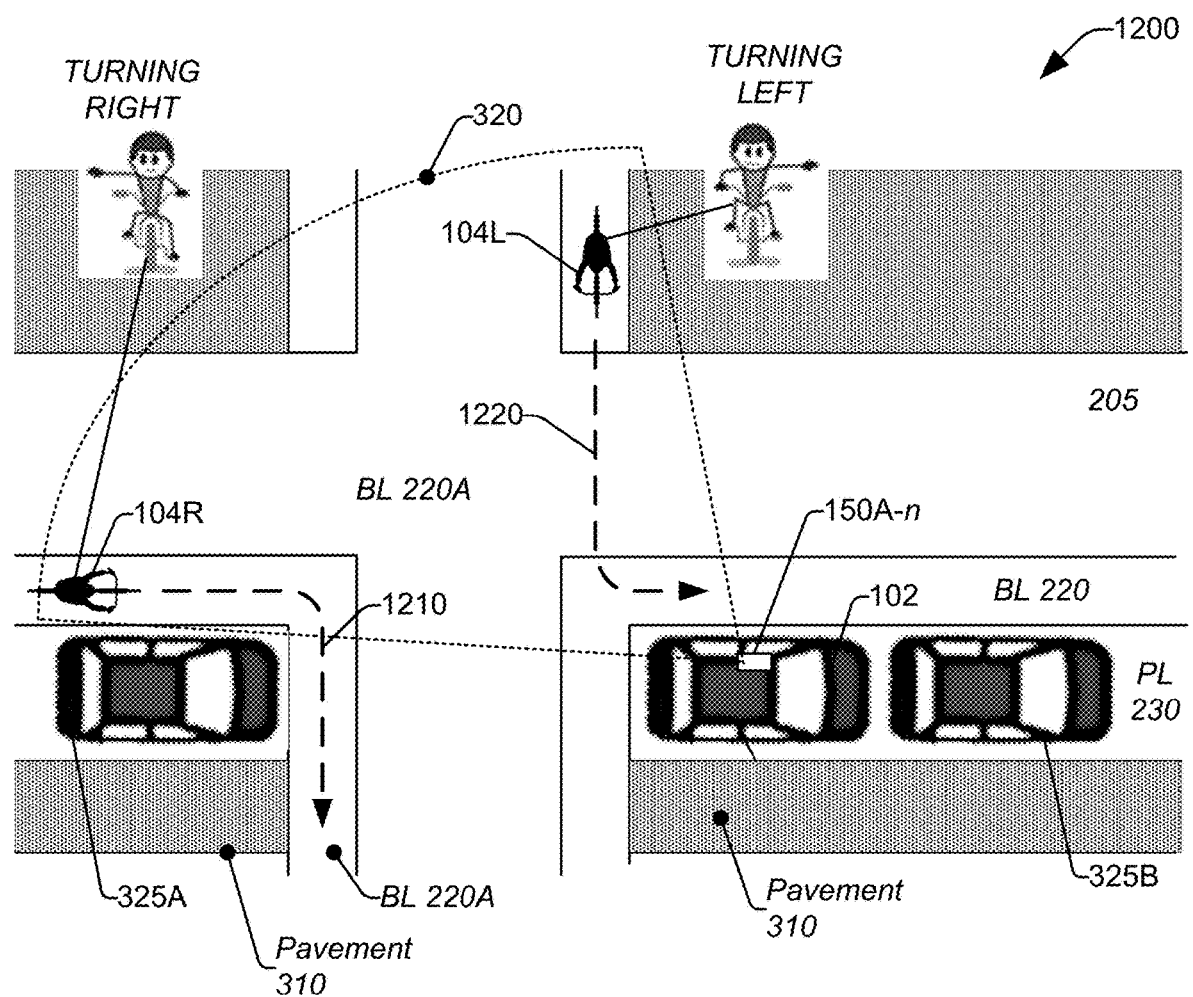
FIG. 12 presents a schematic illustrating detection and determination of a cyclist changing route, in accordance with an embodiment.

FIG. 12, schematic 1200, illustrates detection and determination of a cyclist changing route, in accordance with an embodiment. Image analysis can be performed (by cyclist component 158 in conjunction with cameras/sensors 150A-n and algorithms 164A-n) to determine a direction of travel of a cyclist 104 as indicated by a hand gesture. A cyclist 104 can make a turn signal indicating they will soon be turning right or left. For example, per FIG. 12, cyclist 104R is making a hand gesture indicating they are turning right along a trajectory 1210 down bike lane 220A along a cross street, which will no longer place them proximate to vehicle 102. In another example, cyclist 104L is making a hand gesture indicating they will be following a trajectory 1220 that places them in bike lane 220 and eventually proximate to vehicle 102. In response to a determination that the cyclist 104 indicating that they intend to make a turn, the trajectory 1210/1220 of the cyclist 104 can be monitored and if a determination is made that the cyclist 104 has indeed turned and will no longer be proximate to vehicle 102, monitoring of the position of cyclist 104 can cease. Alternatively, if a trajectory (e.g., trajectory 1220) results in the cyclist 104 will eventually be proximate to vehicle 102, monitoring of the position/velocity of cyclist 104 can be initiated/maintained. In an embodiment, in the event of determining that the cyclist 104 is indicating they intend to turn, GPS data 185 can be reviewed (e.g., by road component 160) to determine whether there is a junction, path, etc., for which the cyclist 104 can turn down, which can be utilized to supplement a determination (e.g., by road component 160, accident component 165) that the cyclist 104 is going to turn, and once having done so, monitoring of the position/speed of the cyclist 104 can cease.

Based on the foregoing, various determinations and inferences can be made, e.g., by accident component 165 regarding whether an occupant 101A-n can exit a vehicle 102, or should be prevented from doing so based upon a proximity of a cyclist 104 to vehicle 102 and a likelihood of a dooring incident occurring. For example, the accident component 165 (based on information/data received from one or more components included in AMS 105 and/or algorithms 164A-n) can make inferences and based thereon, can control operation of the door locks 146 based on various operational thresholds. A first threshold may be based on proximity of cyclist 104 to vehicle 102, and given a velocity of cyclist 104, whether sufficient safe time exists for an occupant 101 to exit vehicle 102 without hitting cyclist 104 with door 103. In response to a determination that the amount of time exceeds the first threshold duration (e.g., there is a low probability/risk of a dooring incident occurring if door 103 is opened), the accident component 165 enables the door 103 to be opened for the occupant to exit. In response to another determination that the time is insufficient and the time is below the first threshold duration (e.g., there is a high probability/risk of a dooring incident occurring if door 103 was opened), the accident component 165 can cause door 103 to be locked by the door lock 146. In another embodiment, in response to a determination that the cyclist 104 is a child, the accident component 165 can extend the first threshold such that a duration that a door 103 is to remain temporarily locked to prevent the child cyclist 104 from being surprised by door 103 being opened by an occupant 101 is greater than for the first threshold when the cyclist 104 is an adult. Accordingly, the first threshold can be adjusted (e.g., by the accident component 165) to account for the various scenarios presented herein, e.g., distracted cyclist, child cyclist, aged cyclist, slow cyclist, fast cyclist. In another embodiment, based on a determination (e.g., by the accident component 165) that the cyclist 104 is sufficiently distanced away from vehicle 102 in the z direction (per FIGS. 5A-B), the accident component 165 can determine that while in the y direction cyclist 104 looks likely to collide with door 103, they have a safe z distance and hence there is low probability of cyclist 104 colliding with door 103.

Hence, the accident component 165 can utilize a threshold duration which is adjusted as the respective scenarios are encountered. For example, a threshold of 5 seconds can be set as a maximum time (a duration of time for the standard threshold) an occupant needs to exit the vehicle, the following inferences can be made and corresponding locking of door 103:

TABLE 2

INFERRING LIKELIHOOD OF ACCIDENT AND CONTROLLING EXIT OF A VEHICLE.

| Time until cyclist at d | Time required to exit vehicle (threshold) | Difference | Inference of door incident | Enable occupant to exit? |
|---|---|---|---|---|
| 15 seconds | 5 seconds | Large | Low | Yes |
| 5 seconds | 5 seconds | Zero | High | No |
| 4 seconds | 5 seconds | Negative | High | No |

To accommodate for such things as a child cyclist, an aged cyclist, a distracted cyclist, etc., the time required (a second, increased duration for the threshold) to exit vehicle parameter can be increased (e.g., to 8 seconds) so as to reduce the safe time for which an occupant 101 can exit the vehicle, and the threshold of whether the door 103 can be opened is now established based on an 8 second exit time. Per the inferences presented in TABLE 1, the time to exit threshold in TABLE 2 can be further increased in accordance with levels of distractions presented in TABLE 1, such that with a high degree of confidence that cyclist 104 is distracted, the threshold duration can be increased, e.g., to 8 seconds. And if further accommodation is made that the cyclist 104 is both distracted and a child, the threshold duration can be extended to 12 seconds, and suchlike.

It is to be appreciated that the respective timings, distances, velocities, probability ratings of dooring incidence, etc., are arbitrary thresholds and can be configured/predefined in accident component 165 to any desired value. As used herein, the terms "infer", "inference", "determine", and suchlike, refer generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

In this particular embodiment, the accident component 165 and the associated algorithms 164A-n can include machine learning and reasoning techniques and technologies that employ probabilistic and/or statistical-based analysis to prognose or infer an action that a user desires to be automatically performed. The various embodiments presented herein can utilize various machine learning-based schemes for carrying out various aspects thereof. For example, a process for determining (a) the possibility of a dooring incident occurring and (b) the likelihood of cyclist 104 being involved in a dooring accident and their proximity to vehicle 102 can be facilitated via an automatic classifier system and process. Hence, a classifier can be trained to err on the side of caution, particularly given that a human life/injury may be at risk. For example, where an inference is made that vehicle 102 may/may not be involved in a dooring incident, the classifier defers to vehicle 102 taking mitigating action (e.g., maintains closure of doors 103, 403, etc., until certainty of no dooring incident will/can occur).

A classifier is a function that maps an input attribute vector, x=(x1, x2, x3, x4, xn), to a class label class (x). The classifier can also output a confidence that the input belongs to a class, that is, f(x)=confidence(class(x)). Such classification can employ a probabilistic and/or statistical-based analysis (e.g., factoring into the analysis utilities and costs) to prognose or infer an action that a user desires to be automatically performed (e.g., inference of a dooring incident occurring).

A support vector machine (SVM) is an example of a classifier that can be employed. The SVM operates by finding a hypersurface in the space of possible inputs that splits the triggering input events from the non-triggering events in an optimal way. Intuitively, this makes the classification correct for testing data that is near, but not identical to training data. Other directed and undirected model classification approaches include, e.g., naïve Bayes, Bayesian networks, decision trees, neural networks, fuzzy logic models, and probabilistic classification models providing different patterns of independence can be employed. Classification as used herein is inclusive of statistical regression that is utilized to develop models of priority.

As will be readily appreciated from the subject specification, the various embodiments can employ classifiers that are explicitly trained (e.g., via a generic training data) as well as implicitly trained (e.g., via observing user behavior, receiving extrinsic information). For example, SVM's are configured via a learning or training phase within a classifier constructor and feature selection module. Thus, the classifier(s) can be used to automatically learn and perform a number of functions, including but not limited to determining according to predetermined criteria a likelihood of a dooring incident resulting from an activity of an occupant 101A-n opening a door into cyclist 104's path and/or cyclist 104's distractedness as approaching vehicle 102, for example.

As described supra, inferences can be made, and operations performed, based on numerous pieces of information. For example, as vehicle 102 monitors and gathers information regarding the actions/motions of cyclists 104A-n, vehicle drivers/occupants 101A-n negligently opening a door, likelihood of dooring occurring when a bike line is present versus when a bike lane is not present, a distance a cyclist may veer to avoid a door being opened, a route taken and/or response of a cyclist when cycling by parked cars (e.g., cyclist 104 rides bike 710 in bike lane 220 as far away from the parked vehicles 325A-n to minimize likelihood of dooring), cyclist height, cyclist age, cyclist distraction, and suchlike. As the database of information accumulates (e.g., in memory 114) regarding interactions between cyclists 104A-n and vehicles 102/occupants 101A-n, the data is analyzed to determine converging patterns such that inferences can be made regarding dooring incidents, and, for example, the arbitrary settings presented in TABLE 1 can be further adjusted to mitigate dooring incidents and vehicle 102 being involved in their occurrence.

Per the foregoing, a determination of a dooring incident being likely/unlikely can depend on numerous factors, including, in a non-limiting list, (a) direction vehicle 102 is parked facing. (b) types of doors on vehicle 102 (e.g., regular doors, suicide doors), (c) distance of cyclist 104 to vehicle 102, (d) velocity with which cyclist 104 is approaching vehicle 102, (e) age of the cyclist 104 (child, adult, senior citizen), (f) riding posture of cyclist 104, (g) hands on handlebars steering bicycle 710, (h) distractedness of cyclist 104, (i) focus of visual attention of cyclist 104, (j) cyclist 104 is swerving/unstable, (k) safe z distance, and suchlike. Wherein, per the foregoing, a determination (e.g., by accident component 165) of likelihood of a dooring incident occurring/or not can be adjusted to take into account a combination of various scenarios and factors/parameters that may be present as a cyclist 104 cycles toward vehicle 102. E.g., a cyclist 104P riding fast towards vehicle 102 without being fully aware of the presence of vehicle 102 can have a higher probability of dooring incident occurring than another cyclist 104Q riding with the same velocity towards vehicle 102, but 104Q is fully aware of the presence of vehicle 102.

FIG. 13, schematic 1300 illustrates inferences of a dooring incident and a corresponding action that can be taken, in accordance with an embodiment. FIG. 13 presents four respective example positions that a cyclist 104 can be located at, positions P1-4 cycling towards vehicle 102 which is parked in parking lane 230, whereby cameras/sensors 150A-n are operating and detect the respective cyclist's positions. Occupant 101 is attempting to exit vehicle 102, wherein, depending upon the position of the cyclist 104, a dooring incident can occur at position d. The positions P1-4 indicate respective times it has been estimated (e.g., by cyclist component 158, accident component 165, based on cyclist 104's velocity, etc.) that cyclist 104 would take to arrive at position d (alongside vehicle 102 and door 103). At position P1, it has been estimated that cyclist 104 will be at position d in 4 seconds, at P2=7 seconds, at P3=12 seconds, and at P4=15 seconds. Accordingly, based on the respective position of cyclist 104 relative to d, a determination can be made as to whether it is safe for occupant 101 to exit vehicle 102. With an estimation that the occupant requires 5 seconds (a threshold value, Thres) to exit the vehicle, with a cyclist 104 at position P1 there is insufficient time for the occupant to exit (4 secs–5 secs=−1 secs), while at positions P3 (12 secs–5 secs=7 secs) and at P4 (15 secs-5 secs=10 secs) there is sufficient safe time for the occupant 101 to safely exit and be seen by cyclist 104. Hence, with the cyclist 104 at P1, the accident component 165 determines with a high degree of confidence that a dooring event will occur, and can further generate a notification 166 that insufficient time exists and door locks 146 remain temporarily closed until cyclist 104 has passed, with a notification 610 presented on screen 119. With the cyclist 104 at P3 or P4, the accident component 165 determines with a high degree of confidence that a dooring event will likely not occur, and can further generate a notification 166 that sufficient time exists and door locks 146 can be left unlocked for occupant 101 to exit. However, at P2 (7 secs-5 secs=2 secs) the accident component 165 can determine with a moderate degree of confidence that sufficient time exists but to defer to safety, generates a notification 166 that insufficient time exists and door locks 146 remain temporarily closed until cyclist 104 has passed, with a notification 610 presented on screen 119.

As mentioned, specific scenarios can involve cyclist 104 being a child, distracted, aged, swerving, etc. Accordingly, to accommodate the scenarios, based on respective scenarios being determined by cyclist component 158, accident component 165, algorithms 164A-n, the threshold time value can be extended to accommodate the respective scenarios, e.g., Thres=10 seconds (e.g., a second threshold) as cyclist 104 is a child riding and is still learning to ride bicycle 710. Now, positions P1 (4 secs–10 secs=−6 secs) and P2 (7 secs–10 secs=−3 secs) are determined (by accident component 165) with a high degree of confidence to have insufficient time for occupant 101 to exit, and door 103 is temporarily locked. Position P4 is determined (by accident component 165) with a high degree of confidence to have sufficient safe time (15 secs–10 secs=5 secs) that the occupant 101 can exit the vehicle. Position P3 is determined (by accident component 165) with a moderate degree of confidence that sufficient safe time (15 secs–10 secs=5 secs) exists such that the occupant 101 can exit the vehicle without causing a dooring incident, but to err on the side of caution, accident component 165 generates a notification 166 that insufficient time exists and door locks 146 remain temporarily closed until cyclist 104 has passed, with a notification 610 presented on screen 119.

As previously mentioned, depending upon the location of the occupant 101A-n and whether there is a cyclist 104 approaching, respective doors 103A-n can be controlled to remain locked while other doors 103A-n may be opened. For example, upon vehicle 102 being parked, a determination (e.g., by accident component 165) can be made that no cyclist 104 is currently riding along the pavement 310, the occupant 101B (per FIG. 4) can exit the vehicle via an unlocked door 103B. However, concurrently, a determination (e.g., by accident component 165) can be made that a cyclist 104 is currently riding along bike lane 220 and there is a high probability of a dooring incident if occupant 101A (FIG. 4) opens door 103A, and accordingly, accident component 165 temporarily locks door 103A to prevent occupant 101A from opening it while the cyclist 104 is passing by door 103A.

Figure 14:
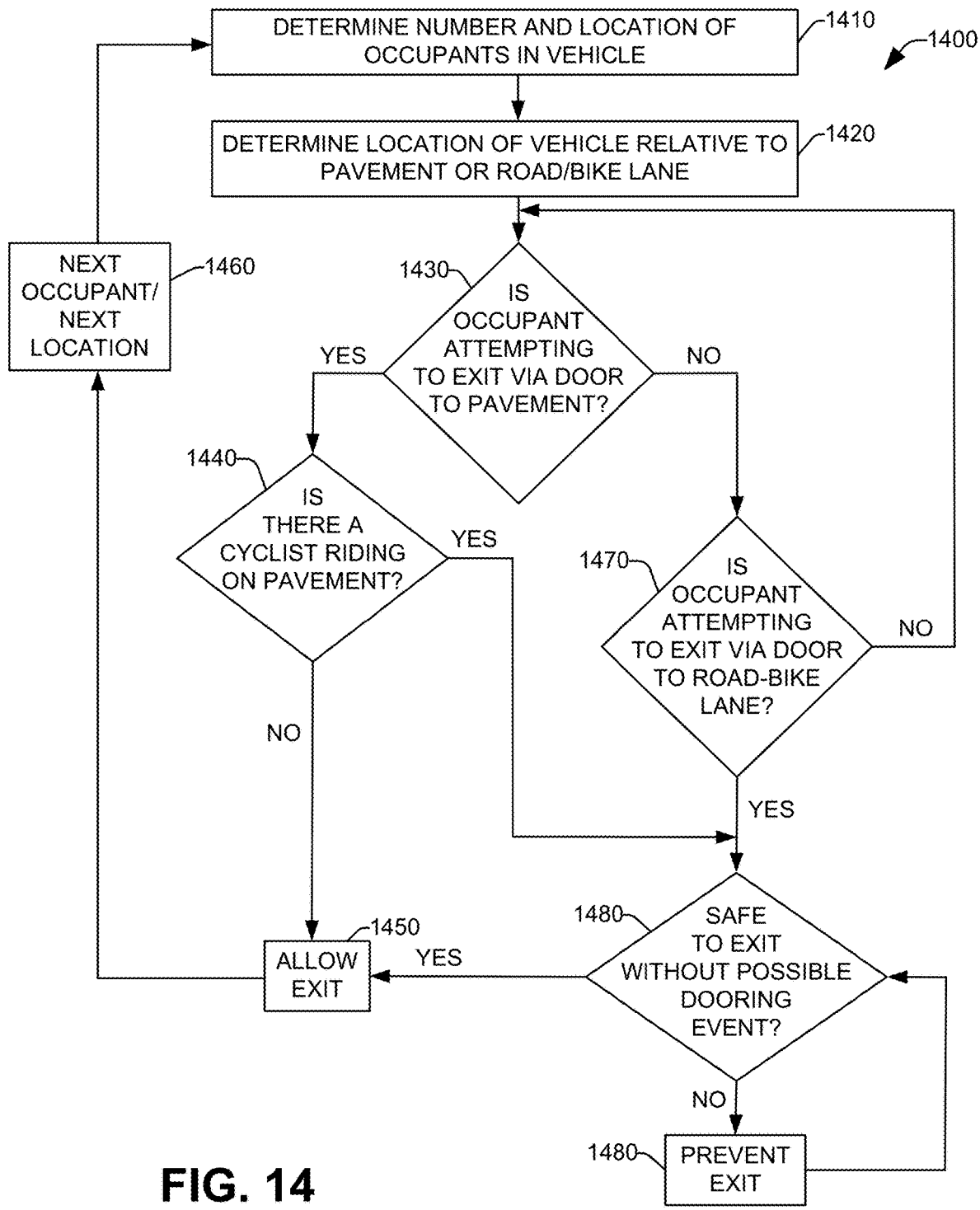
FIG. 14 illustrates a flow diagram for a computer-implemented methodology to mitigate involvement of an occupant of a vehicle in a car dooring incident with a cyclist, in accordance with at least one embodiment.

FIG. 14 illustrates a flow diagram 1400 for a computer-implemented methodology to mitigate involvement of an occupant of a vehicle in a car dooring incident with a cyclist, in accordance with at least one embodiment.

At 1410, a number of occupants (occupants 101A-n) and their respective location within a vehicle (vehicle 102) can be determined (e.g., by occupant component 162, seat sensors 153, seat belt sensors 152, cameras/sensors 150A-n).

At 1420, the respective location of each occupant in the vehicle relative to whether their side of the vehicle is located next to a road (e.g., road 205 on which vehicle 102 is parked) or next to a pavement (e.g., pavement 310) can be determined.

At 1430, a determination can be made whether the occupant is sat next to the pavement and is attempting to exit the vehicle via a door (door 103) that opens on to the pavement? Determination of which door the occupant is attempting to exit by can be determined (e.g., by door lock/handle sensors 151) based on the occupant interacting with a door lock/door handle of the door which they are attempting to exit by. In response to YES, the occupant is attempting to exit onto the pavement, methodology 1440 can advance to step 1440, wherein a determination can be made as to whether a cyclist (e.g., cyclist 104) is riding on the pavement (wherein, the determination can be made by cyclist component 158/accident component 165 in conjunction with images/data received from sensors/cameras 150A-n processed by algorithms 164A-n).

At 1440, in response to a determination that there is no cyclist riding on the sidewalk or the cyclist is sufficiently far enough away (in the y or z direction) from the vehicle for a safe exit to be made, methodology 1400 can advance to 1450, wherein the occupant can be allowed to exit. For example, upon a determination (e.g., by accident component 165) that no cyclist is present or is sufficiently far enough away, a notification can be generated (e.g., notification 166 by accident component 165) and received by a component (e.g., devices component 144) configured to control operation of the door lock (e.g., door locks 146), such that the door lock is opened enabling the door to be opened and the occupant to exit. Methodology 1400 can advance to 1460 to determine location of another occupant or await the next time the vehicle is parked.

Returning to 1430, in the event of the occupant is determined to not be attempting to exit to the pavement, methodology 1400 can advance to step 1470, wherein a determination can be made (e.g., by occupant component 162) that the occupant is attempting to exit via a door to the street/bike-lane (e.g., road 205, bike lane 220). In response to a determination of YES, the occupant is attempting to exit to the road, methodology 1400 can advance to step 1480, wherein a determination can be made as to whether a cyclist (e.g., cyclist 104) is riding along the road (wherein, the determination can be made by cyclist component 158/accident component 165 in conjunction with images/data received from sensors/cameras 150A-n processed by algorithms 164A-n).

At 1480, in response to a determination that there is no cyclist riding on the sidewalk or the cyclist is sufficiently far enough away from the vehicle for a safe exit to be made, methodology 1400 can advance to 1450, wherein the occupant can be allowed to exit. For example, upon a determination (e.g., by accident component 165) that no cyclist is present or is sufficiently far enough away, a notification can be generated (e.g., notification 166 by accident component 165) and received by a component (e.g., devices component 144) configured to control operation of the door lock (e.g., door locks 146), such that the door lock is opened enabling the door to be opened and the occupant to exit. Methodology 1400 can advance to 1460 to determine location of another occupant or await the next time the vehicle is parked.

Returning to 1470, in the event of determining that the occupant is currently not attempting to exit, methodology 1400 can return to 1430 for a further determination to be made regarding whether the occupant is attempting to exit, and if so, by which door. It is to be appreciated, that while it may be safe for an occupant to exit to the pavement (e.g., no dooring event likely), at the same time, it may not be safe for the occupant to exit to the street as a dooring event may be likely.

Returning to 1480, in response to a determination that it is not safe for the occupant to open the door and exit, the door can be temporarily locked (e.g., based on a notification generated by accident component 165, received by devices component 144 and door lock 146) to prevent the occupant leaving until the cyclist has passed by, and there is no risk of a dooring incident. Whereupon a determination can be continually made, at 1480, as to whether it is safe for the occupant to exit or not. In response to a determination that it is safe for the occupant to exit, methodology can advance to step 1450, with the occupant exiting the vehicle.

Returning to 1440, in response to a determination that there is a cyclist riding on the pavement, methodology 1400 advances to 1480, wherein, a determination can be made regarding whether it is safe for the occupant to exit the vehicle.

Figure 15:
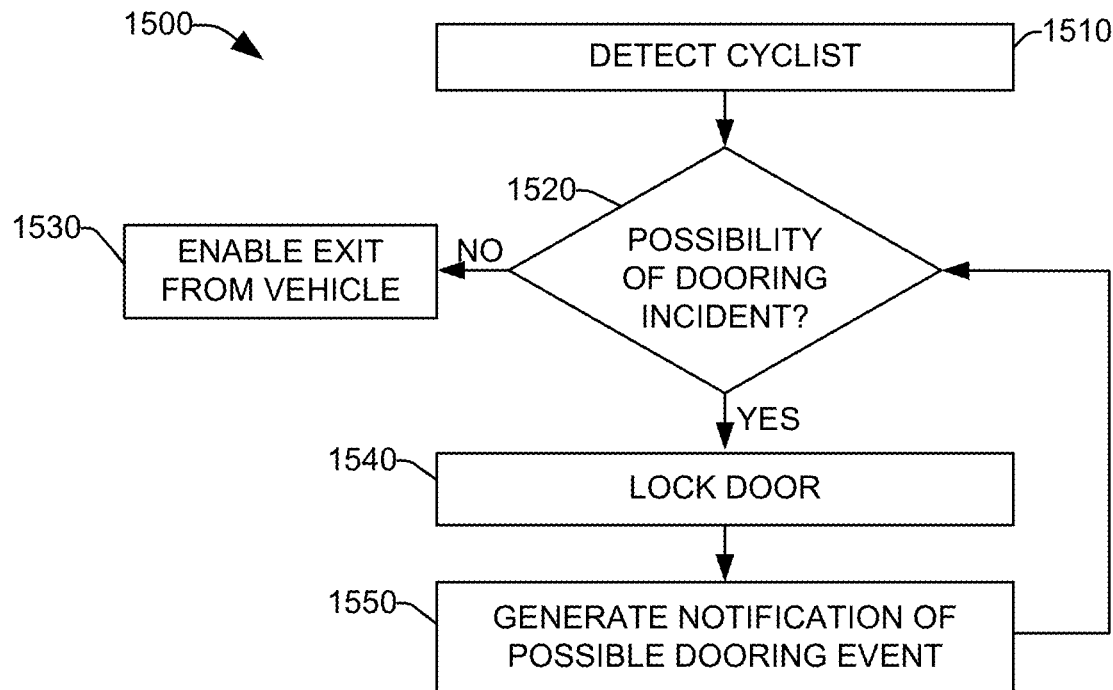
FIG. 15 illustrates a flow diagram for a computer-implemented methodology to mitigate involvement of an occupant of a vehicle in a car dooring incident with a cyclist, in accordance with at least one embodiment.

FIG. 15 illustrates a flow diagram 1500 for a computer-implemented methodology to mitigate involvement of an occupant of a vehicle in a car dooring incident with a cyclist, in accordance with at least one embodiment.

At 1510, a cyclist (e.g., cyclist 104) can be detected (e.g., by cyclist component 158) riding towards a vehicle (e.g., vehicle 102), wherein the cyclist is detected by an imaging system (e.g., cameras/sensors 150A-n, algorithms 164A-n, etc.), wherein the vehicle is currently parked (e.g., at the side of road 205).

At 1520, the possibility of a dooring incident can be determined (e.g., by accident component 165, algorithms 164A-n). In an embodiment, the dooring incident can involve cyclist colliding with a door (e.g., door 103) on the vehicle being opened by an occupant (e.g., occupant 101) or the cyclist colliding with the occupant as the occupant exits the vehicle. In response to a determination (e.g., by accident component 165) that no dooring incident is likely, methodology 1500 can advance to 1530, whereupon the door locks (e.g., door locks 146) can be opened (e.g., by devices component 144) and the occupant can exit the vehicle.

At 1520, in response to a determination (e.g., by accident component 165) that it is not safe for the occupant to exit the vehicle, e.g., a high probability of a dooring incident exists, the door which the occupant is attempting to use to exit the vehicle can be temporarily locked. At 1550, a notification (e.g., notification 610) can be generated (e.g., by accident component 165) and presented on a screen (e.g., screen 119).

Figure 16:
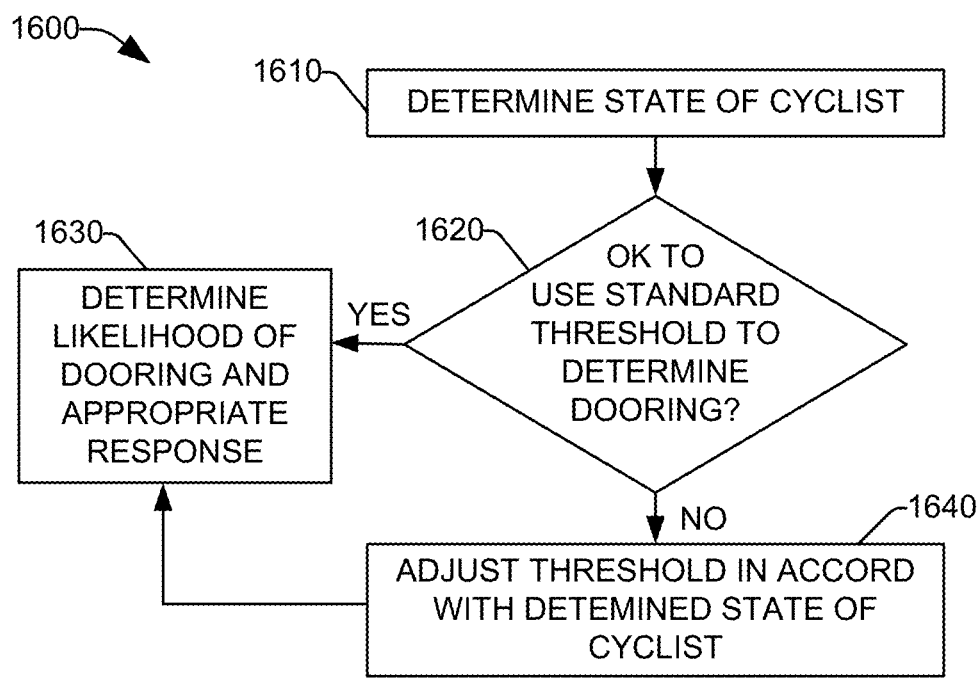
FIG. 16 illustrates a flow diagram for a computer-implemented methodology to mitigate involvement of an occupant of a vehicle in a car dooring incident with a cyclist, in accordance with at least one embodiment.

FIG. 16 illustrates a flow diagram 1600 for a computer-implemented methodology to mitigate involvement of an occupant of a vehicle in a car dooring incident with a cyclist, in accordance with at least one embodiment.

At 1610, a cyclist (e.g., cyclist 104) can be detected (e.g., by cyclist component 158) riding towards a vehicle (e.g., vehicle 102), and their state can be determined (e.g., by cyclist component 158) wherein the cyclist is detected by an imaging system (e.g., cameras/sensors 150A-n, algorithms 164A-n, etc.), wherein the vehicle is currently parked (e.g., at the side of road 205). As previously mentioned herein, the state of the cyclist can range from whether they are an adult, child, old person, are riding in a distracted manner, are riding in an engaged/aware manner, a riding in an unstable manner, and suchlike.

At 1620, a determination (e.g., by accident component 165) can be made regarding whether a standard threshold should be used to determine a possibility of a dooring incident occurring based upon the determined state of the cyclist. In an embodiment the standard threshold can be a time for which it takes an occupant to open a vehicle door (e.g., door 103) and exit the vehicle. For example, the standard threshold might be set to 5 seconds. However, as previously mentioned, the state of the cyclist can be accommodated and the threshold is accordingly adjusted. For example, a child cyclist may be given more time to approach and navigate by the door, such that the duration of the threshold is extended. Per FIG. 13, the threshold (thres) can be configured with a standard time of 5 seconds, but the standard/first threshold can be extended to second threshold of 10 seconds in view of the cyclist being a child. E.g., an occupant exiting the vehicle may overly surprise the child cyclist compared to the cyclist being an adult. In a determination (e.g., by accident component 165) that given the cyclist is a fully focused adult (e.g., FIG. 8, cyclist 104A), the threshold can remain at the standard duration, wherein methodology 1600 can advance to 1630. At 1630, a probability of a dooring event can be assessed based on the standard threshold, and the appropriate response initiated (e.g., no dooring event=occupant can exit, yes dooring event likely=doors temporarily locked).

Returning to 1620, in response to a determination that the state of the cyclist engenders a different threshold to be utilized, a threshold can be generated based on the cyclist's state. Methodology 1600 can advance to step 1630, wherein a determination (e.g., by accident component 165) can be made regarding whether a dooring event is likely based in part on the state of the cyclist.

FIG. 17 illustrates a flow diagram 1700 for a computer-implemented methodology to determine a height H of a cyclist and adjust probabilities/threshold of a dooring incident and response thereto, in accordance with at least one embodiment.

At 1710, as previously described, the height H of a cyclist (e.g., cyclist 104) can be determined (e.g., by cyclist component 158 in conjunction with information captured by sensors 150A-n, such as digital images from a camera, as processed by imaging algorithms 164A-n).

At 1720, a determination can be made regarding whether the cyclist is an adult or a child. In an embodiment, the adult/child determination can be conducted based on the determined height in comparison with a pre-defined value, wherein the pre-defined can be an arbitrary value, e.g., 150 cm. In response to a determination that H>150 cm, methodology 1700 can advance to 1730, the cyclist can be assessed as an adult and the probability settings and according response by the vehicle (e.g., accident component 165 and associated components onboard vehicle 102), as detailed in TABLE 1 can be applied (e.g., standard threshold value can be utilized). Methodology 1700 can return to 1710 for a subsequent determination of child height.

Returning to step 1720, in response to a determination that the height of the cyclist is ≤150 cm, the cyclist can be assessed as a child, methodology 1700 can advance to 1740, the probability settings can be made stricter/tightened (e.g., duration of threshold is increased) and according response by the vehicle (e.g., accident component 165 and associated components onboard vehicle 102). Methodology 1700 can return to 1710 for a subsequent determination of a cyclist's height.

FIG. 18 illustrates a flow diagram 1800 for a computer-implemented methodology to determine an age of a cyclist and adjust probabilities/threshold of a dooring incident and response thereto, in accordance with at least one embodiment.

At 1810, a cyclist (e.g., cyclist 104) can be detected (e.g., by cyclist component 158 in conjunction with information captured by sensors 150A-n, such as digital images from a camera, as processed by imaging algorithms 164A-n) cycling towards a vehicle (e.g., vehicle 102).

At 1820, the face of the cyclist can be captured (e.g., by cyclist component 158 in conjunction with information captured by sensors 150A-n, such as digital images from a camera, as processed by imaging algorithms 164A-n) and processed.

At 1830, the digital images can be processed to determine whether the cyclist is an old person, or is person aged between 15 years old and 60 years old. In response to a determination that the cyclist is an old person (e.g., age>60 years old), respective parameters and threshold value (thres) can be adjusted to accommodate issues pertaining to an older person (e.g., slow response time, instability, exacerbated injury). Methodology can advance to 1840, wherein the standard duration of the threshold can be extended for use in determining whether a dooring incident is likely.

Returning to 1830, in response to determination that the cyclist does not have facial features of an old person, methodology 1800 can advance to 1850, whereupon a determination can be made regarding whether the cyclist is a child, based on their facial features. In response to a determination that yes, the cyclist is a child based on their facial features, methodology 1800 can advance to 1840, whereupon respective parameters and threshold value (thres) can be adjusted to accommodate issues pertaining to a child (e.g., distracted, unsteady balance). Methodology can advance to 1840, wherein the standard duration of the threshold can be extended for use in determining whether a dooring incident is likely.

At 1850, in response to a determination that the cyclist does not look like a child, methodology 1800 can advance to 1860, wherein the standard threshold and parameters can be utilized to determine whether a dooring incident is likely.

Figure 19:
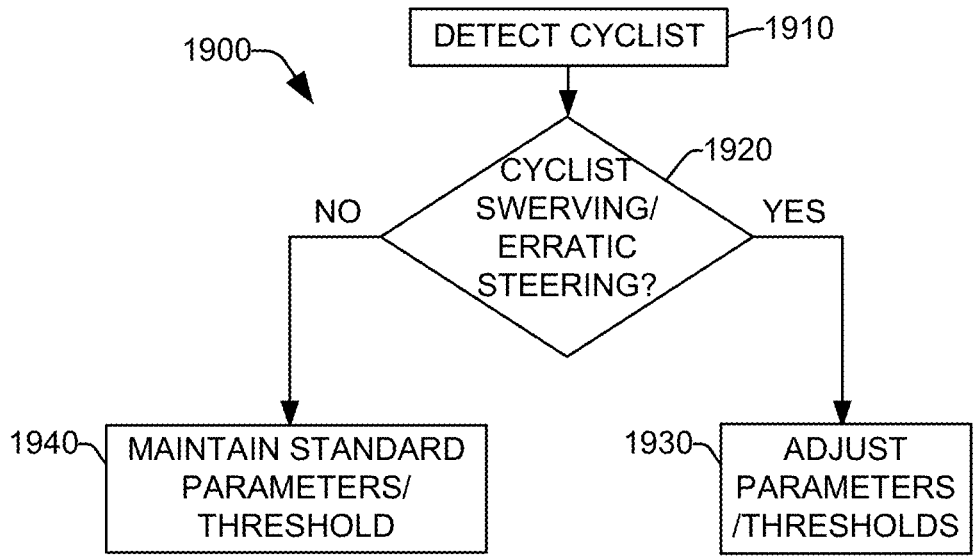
FIG. 19 illustrates a flow diagram for a computer-implemented methodology to determine whether a cyclist is swerving and adjust probabilities/threshold of a dooring incident and response thereto, in accordance with at least one embodiment.

FIG. 19 illustrates a flow diagram 1900 for a computer-implemented methodology to determine whether a cyclist is swerving and adjust probabilities/threshold of a dooring incident and response thereto, in accordance with at least one embodiment.

At 1910, a cyclist (e.g., cyclist 104) can be detected (e.g., by cyclist component 158 in conjunction with information captured by sensors 150A-n, such as digital images from a camera, as processed by imaging algorithms 164A-n) cycling towards a vehicle (e.g., vehicle 102).

At 1920, a determination (e.g., by cyclist component 158, accident component 165) can be made regarding whether the cyclist is swerving (e.g., erratically) as the cyclist rides towards the vehicle. In response to a determination that the cyclist is swerving, respective parameters and threshold value (thres) can be adjusted to accommodate issues pertaining to a cyclist being intoxicated, unsteady on bicycle, etc. Methodology can advance to 1930, wherein the standard duration of the threshold can be extended for use in determining whether a dooring incident is likely.

Returning to step 1920, in response to a determination that the cyclist is not swerving, the standard threshold and parameters can be utilized to determine whether a dooring incident is likely.

Figure 20:
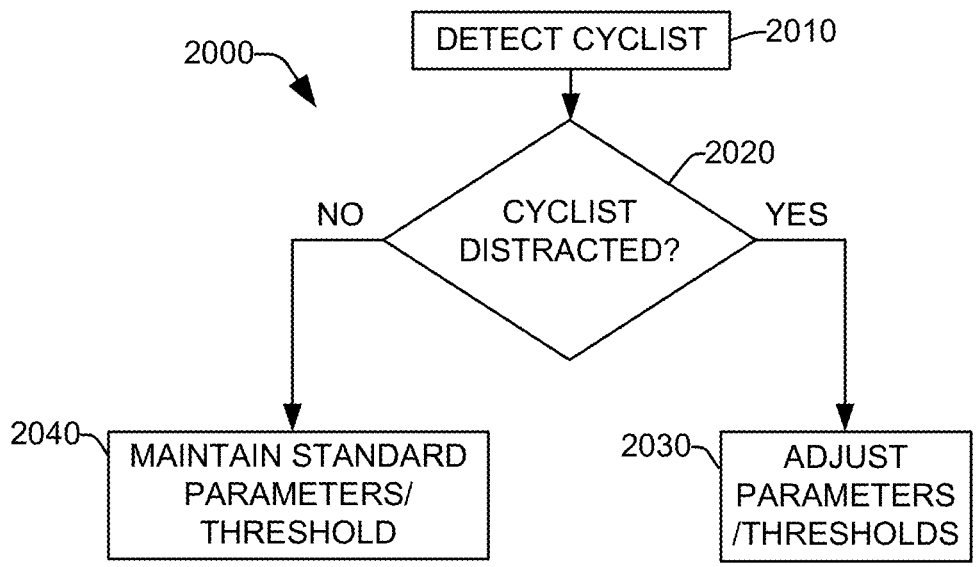
FIG. 20 illustrates a flow diagram 2000 for a computer-implemented methodology to determine whether a cyclist is distracted and adjust probabilities/threshold of a dooring incident and response thereto, in accordance with at least one embodiment.

FIG. 20 illustrates a flow diagram 2000 for a computer-implemented methodology to determine whether a cyclist is distracted and adjust probabilities/threshold of a dooring incident and response thereto, in accordance with at least one embodiment.

At 2010, a cyclist (e.g., cyclist 104) can be detected (e.g., by cyclist component 158 in conjunction with information captured by sensors 150A-n, such as digital images from a camera, as processed by imaging algorithms 164A-n) cycling towards a vehicle.

At 2020, a determination (e.g., by cyclist component 158, accident component 165) can be made regarding whether the cyclist is distracted as the cyclist rides towards the vehicle. The assessment of distraction can be based on the cyclist engaged with their surroundings (e.g., facing ahead, aware of parked vehicles, hands on handlebars steering, looking at a hand-held device such as a cellphone, and suchlike). In response to a determination that the cyclist is distracted, respective parameters and threshold value (thres) can be adjusted to accommodate issues pertaining to a cyclist being distracted. Methodology can advance to 2030, wherein the standard duration of the threshold can be extended for use in determining whether a dooring incident is likely.

Returning to step 2020, in response to a determination that the cyclist is not distracted, the standard threshold and parameters can be utilized to determine whether a dooring incident is likely.

Figure 21:
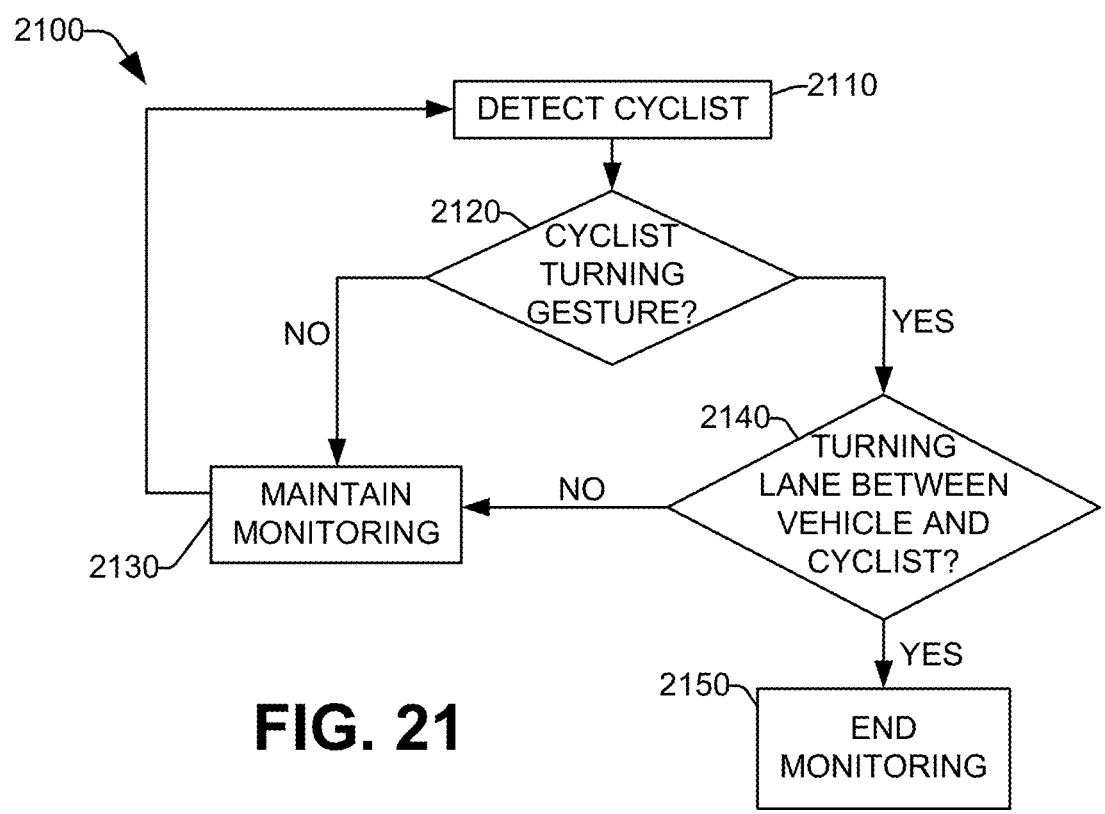
FIG. 21 illustrates a flow diagram for a computer-implemented methodology to determine whether a cyclist is changing direction and no longer needs to be monitored, in accordance with at least one embodiment.

FIG. 21 illustrates a flow diagram 2100 for a computer-implemented methodology to determine whether a cyclist is changing direction and no longer needs to be monitored, in accordance with at least one embodiment.

At 2110, a cyclist (e.g., cyclist 104) can be detected (e.g., by cyclist component 158 in conjunction with information captured by sensors 150A-n, such as digital images from a camera, as processed by imaging algorithms 164A-n) cycling towards a vehicle.

At 2120, a determination (e.g., by cyclist component 158, accident component 165) can be made regarding whether the cyclist is making a hand signal indicating that the cyclist intends to turn. In response to determination (e.g., by cyclist component 158, accident component 165) that the cyclist is not showing any indication of change in direction, methodology 2100 can proceed to 2130, where monitoring of the cyclist cycling towards the vehicle is continued. Methodology 2100 can return to 2110 for continued determination of whether the cyclist is indicating a change of direction.

Returning to 2120, in response to determining the cyclist is indicating a change in direction, methodology 2100 can advance to 2140, where a determination can be made as to whether the cyclist intends to turn before or after the location of the vehicle. In an embodiment, a determination can be made to identify a potential route for the cyclist to turn onto, e.g., using available GPS and road data (e.g., by road component 160 with road data 161 and GPS data/map 185). In response to a determination (e.g., by accident component 165 with road component 160) that there is no other route and the gesture may be being interpreted incorrectly by the onboard system (e.g., by AMS 105 and pertinent subcomponents), methodology 2100 can advance to 2130, where monitoring of the cyclist cycling towards the vehicle is continued.

Returning to 2140, in response to a determination that the cyclist has gestured to turn, and has turned, position and velocity monitoring of the cyclist can cease.

In an embodiment, the cyclist may be gesturing to turn, but the trajectory of the turn still places the cyclist near to the vehicle, and monitoring of the cyclist is to continue.

Example Operating Environment and Scenarios

Figure 22:
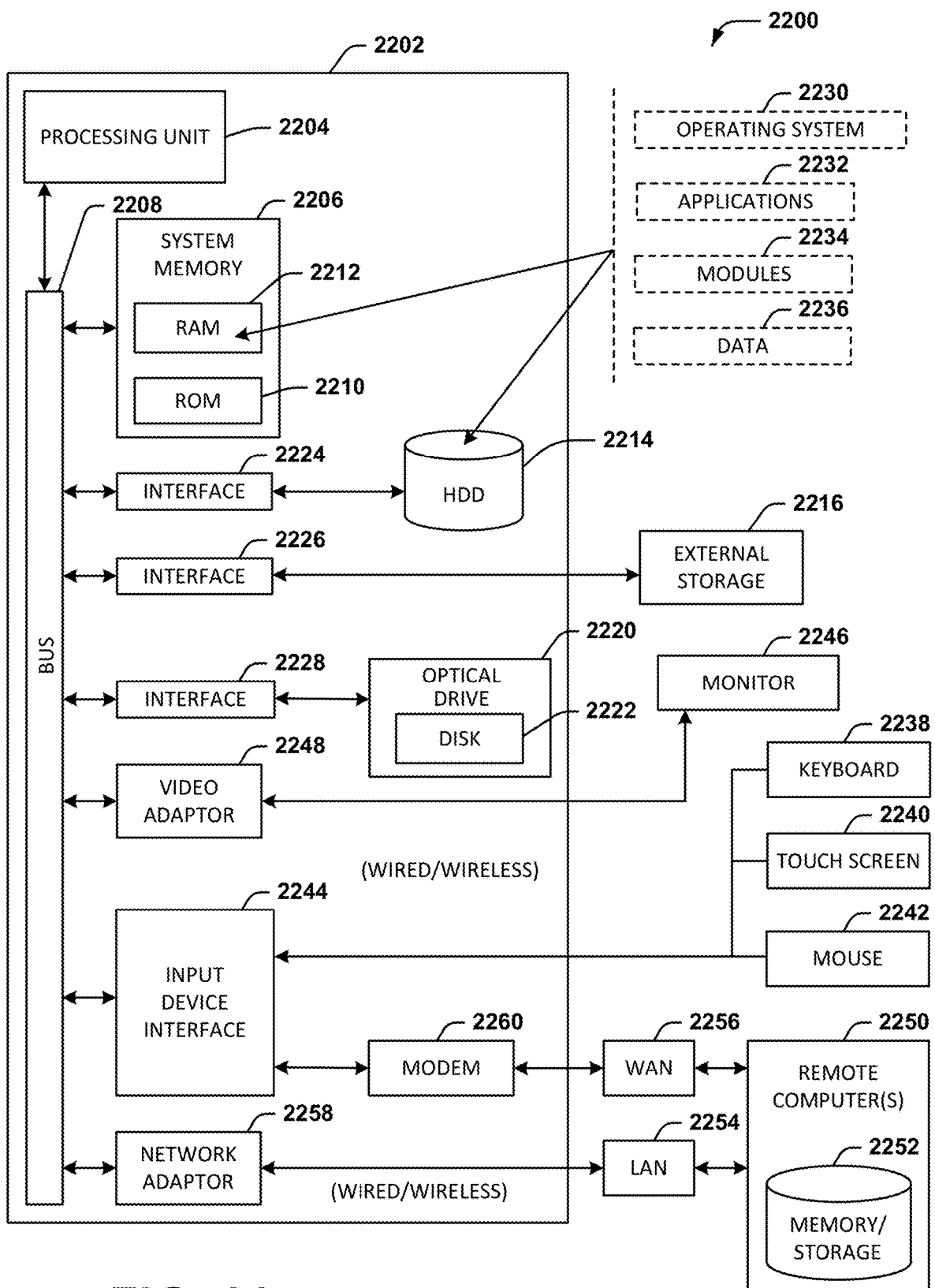
FIG. 22 is a block diagram illustrating an example computing environment in which the various embodiments described herein can be implemented.
Figure 23:
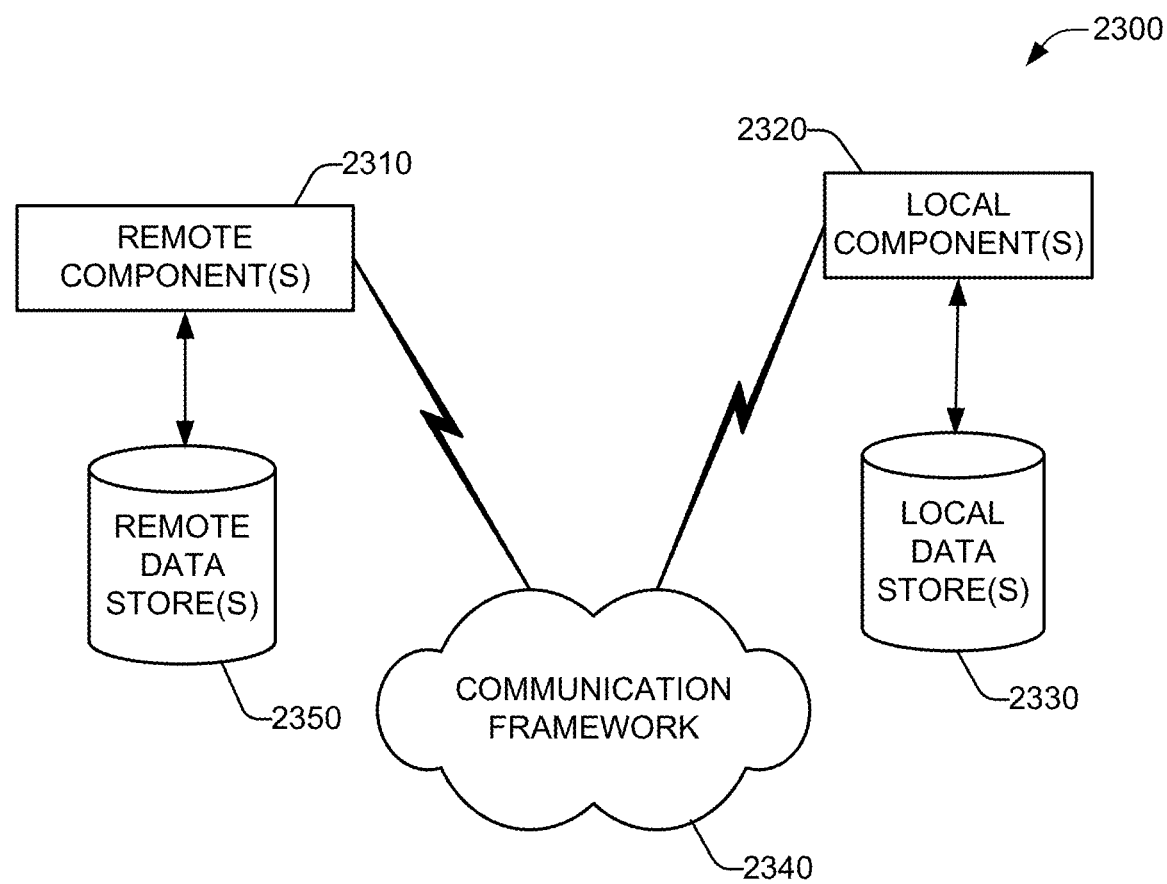
FIG. 23 is a block diagram illustrating an example computing environment with which the disclosed subject matter can interact, in accordance with an embodiment.

Turning next to FIGS. 22 and 23, a detailed description is provided of additional context for the one or more embodiments described herein with FIGS. 1-21.

In order to provide additional context for various embodiments described herein, FIG. 22 and the following discussion are intended to provide a brief, general description of a suitable computing environment 2200 in which the various embodiments described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the methods can be practiced with other computer system configurations, including single-processor or multiprocessor computer systems, minicomputers, mainframe computers, IoT devices, distributed computing systems, as well as personal computers, hand-held computing devices, microprocessor-based or programmable consumer electronics, and the like, each of which can be operatively coupled to one or more associated devices.

The embodiments illustrated herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 22, the example environment 2200 for implementing various embodiments of the aspects described herein includes a computer 2202, the computer 2202 including a processing unit 2204, a system memory 2206 and a system bus 2208. The system bus 2208 couples system components including, but not limited to, the system memory 2206 to the processing unit 2204. The processing unit 2204 can be any of various commercially available processors and may include a cache memory. Dual microprocessors and other multi-processor architectures can also be employed as the processing unit 2204.

The system bus 2208 can be any of several types of bus structure that can further interconnect to a memory bus (with or without a memory controller), a peripheral bus, and a local bus using any of a variety of commercially available bus architectures. The system memory 2206 includes ROM 2210 and RAM 2212. A basic input/output system (BIOS) can be stored in a non-volatile memory such as ROM, erasable programmable read only memory (EPROM), EEPROM, which BIOS contains the basic routines that help to transfer information between elements within the computer 2202, such as during startup. The RAM 2212 can also include a high-speed RAM such as static RAM for caching data.

The computer 2202 further includes an internal hard disk drive (HDD) 2214 (e.g., EIDE, SATA), one or more external storage devices 2216 (e.g., a magnetic floppy disk drive (FDD) 2216, a memory stick or flash drive reader, a memory card reader, etc.) and an optical disk drive 2220 (e.g., which can read or write from a CD-ROM disc, a DVD, a BD, etc.). While the internal HDD 2214 is illustrated as located within the computer 2202, the internal HDD 2214 can also be configured for external use in a suitable chassis (not shown). Additionally, while not shown in environment 2200, a solid-state drive (SSD) could be used in addition to, or in place of, an HDD 2214. The HDD 2214, external storage device(s) 2216 and optical disk drive 2220 can be connected to the system bus 2208 by an HDD interface 2224, an external storage interface 2226 and an optical drive interface 2228, respectively. The interface 2224 for external drive implementations can include at least one or both of Universal Serial Bus (USB) and Institute of Electrical and Electronics Engineers (IEEE) 1094 interface technologies. Other external drive connection technologies are within contemplation of the embodiments described herein.

The drives and their associated computer-readable storage media provide nonvolatile storage of data, data structures, computer-executable instructions, and so forth. For the computer 2202, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 2212, including an operating system 2230, one or more application programs 2232, other program modules 2234 and program data 2236. All or portions of the operating system, applications, modules, and/or data can also be cached in the RAM 2212. The systems and methods described herein can be implemented utilizing various commercially available operating systems or combinations of operating systems.

Computer 2202 can optionally comprise emulation technologies. For example, a hypervisor (not shown) or other intermediary can emulate a hardware environment for operating system 2230, and the emulated hardware can optionally be different from the hardware illustrated in FIG. 22. In such an embodiment, operating system 2230 can comprise one virtual machine (VM) of multiple VMs hosted at computer 2202. Furthermore, operating system 2230 can provide runtime environments, such as the Java runtime environment or the .NET framework, for applications 2232. Runtime environments are consistent execution environments that allow applications 2232 to run on any operating system that includes the runtime environment. Similarly, operating system 2230 can support containers, and applications 2232 can be in the form of containers, which are lightweight, standalone, executable packages of software that include, e.g., code, runtime, system tools, system libraries and settings for an application.

Further, computer 2202 can comprise a security module, such as a trusted processing module (TPM). For instance with a TPM, boot components hash next in time boot components, and wait for a match of results to secured values, before loading a next boot component. This process can take place at any layer in the code execution stack of computer 2202, e.g., applied at the application execution level or at the operating system (OS) kernel level, thereby enabling security at any level of code execution.

A user can enter commands and information into the computer 2202 through one or more wired/wireless input devices, e.g., a keyboard 2238, a touch screen 2240, and a pointing device, such as a mouse 2242. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 2204 through an input device interface 2244 that can be coupled to the system bus 2208, but can be connected by other interfaces, such as a parallel port, an IEEE 1094 serial port, a game port, a USB port, an IR interface, a BLUETOOTH® interface, etc.

A monitor 2246 or other type of display device can be also connected to the system bus 2208 via an interface, such as a video adapter 2248. In addition to the monitor 2246, a computer typically includes other peripheral output devices (not shown), such as speakers, printers, etc.

The computer 2202 can operate in a networked environment using logical connections via wired and/or wireless communications to one or more remote computers, such as a remote computer(s) 2250. The remote computer(s) 2250 can be a workstation, a server computer, a router, a personal computer, portable computer, microprocessor-based entertainment appliance, a peer device or other common network node, and typically includes many or all of the elements described relative to the computer 2202, although, for purposes of brevity, only a memory/storage device 2252 is illustrated. The logical connections depicted include wired/wireless connectivity to a local area network (LAN) 2254 and/or larger networks, e.g., a wide area network (WAN) 2256. Such LAN and WAN networking environments are commonplace in offices and companies, and facilitate enterprise-wide computer networks, such as intranets, all of which can connect to a global communications network, e.g., the internet.

When used in a LAN networking environment, the computer 2202 can be connected to the local network 2254 through a wired and/or wireless communication network interface or adapter 2258. The adapter 2258 can facilitate wired or wireless communication to the LAN 2254, which can also include a wireless access point (AP) disposed thereon for communicating with the adapter 2258 in a wireless mode.

When used in a WAN networking environment, the computer 2202 can include a modem 2260 or can be connected to a communications server on the WAN 2256 via other means for establishing communications over the WAN 2256, such as by way of the internet. The modem 2260, which can be internal or external and a wired or wireless device, can be connected to the system bus 2208 via the input device interface 2244. In a networked environment, program modules depicted relative to the computer 2202 or portions thereof, can be stored in the remote memory/storage device 2252. It will be appreciated that the network connections shown are example and other means of establishing a communications link between the computers can be used.

When used in either a LAN or WAN networking environment, the computer 2202 can access cloud storage systems or other network-based storage systems in addition to, or in place of, external storage devices 2216 as described above. Generally, a connection between the computer 2202 and a cloud storage system can be established over a LAN 2254 or WAN 2256 e.g., by the adapter 2258 or modem 2260, respectively. Upon connecting the computer 2202 to an associated cloud storage system, the external storage interface 2226 can, with the aid of the adapter 2258 and/or modem 2260, manage storage provided by the cloud storage system as it would other types of external storage. For instance, the external storage interface 2226 can be configured to provide access to cloud storage sources as if those sources were physically connected to the computer 2202.

The computer 2202 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

The above description includes non-limiting examples of the various embodiments. It is, of course, not possible to describe every conceivable combination of components or methodologies for purposes of describing the disclosed subject matter, and one skilled in the art may recognize that further combinations and permutations of the various embodiments are possible. The disclosed subject matter is intended to embrace all such alterations, modifications, and variations that fall within the spirit and scope of the appended claims.

Referring now to details of one or more elements illustrated at FIG. 23, an illustrative cloud computing environment 2300 is depicted. FIG. 23 is a schematic block diagram of a computing environment 2300 with which the disclosed subject matter can interact. The system 2300 comprises one or more remote component(s) 2310. The remote component(s) 2310 can be hardware and/or software (e.g., threads, processes, computing devices). In some embodiments, remote component(s) 2310 can be a distributed computer system, connected to a local automatic scaling component and/or programs that use the resources of a distributed computer system, via communication framework 2340. Communication framework 2340 can comprise wired network devices, wireless network devices, mobile devices, wearable devices, radio access network devices, gateway devices, femtocell devices, servers, etc.

The system 2300 also comprises one or more local component(s) 2320. The local component(s) 2320 can be hardware and/or software (e.g., threads, processes, computing devices). In some embodiments, local component(s) 2320 can comprise an automatic scaling component and/or programs that communicate/use the remote resources 2310 and 2320, etc., connected to a remotely located distributed computing system via communication framework 2340.

One possible communication between a remote component(s) 2310 and a local component(s) 2320 can be in the form of a data packet adapted to be transmitted between two or more computer processes. Another possible communication between a remote component(s) 2310 and a local component(s) 2320 can be in the form of circuit-switched data adapted to be transmitted between two or more computer processes in radio time slots. The system 2300 comprises a communication framework 2340 that can be employed to facilitate communications between the remote component(s) 2310 and the local component(s) 2320, and can comprise an air interface, e.g., Uu interface of a UMTS network, via a long-term evolution (LTE) network, etc. Remote component(s) 2310 can be operably connected to one or more remote data store(s) 2350, such as a hard drive, solid state drive, SIM card, device memory, etc., that can be employed to store information on the remote component(s) 2310 side of communication framework 2340. Similarly, local component(s) 2320 can be operably connected to one or more local data store(s) 2330, that can be employed to store information on the local component(s) 2320 side of communication framework 2340.

With regard to the various functions performed by the above described components, devices, circuits, systems, etc., the terms (including a reference to a "means") used to describe such components are intended to also include, unless otherwise indicated, any structure(s) which performs the specified function of the described component (e.g., a functional equivalent), even if not structurally equivalent to the disclosed structure. In addition, while a particular feature of the disclosed subject matter may have been disclosed with respect to only one of several implementations, such feature may be combined with one or more other features of the other implementations as may be desired and advantageous for any given or particular application.

The terms "exemplary" and/or "demonstrative" as used herein are intended to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent structures and techniques known to one skilled in the art. Furthermore, to the extent that the terms "includes," "has," "contains," and other similar words are used in either the detailed description or the claims, such terms are intended to be inclusive—in a manner similar to the term "comprising" as an open transition word-without precluding any additional or other elements.

The term "or" as used herein is intended to mean an inclusive "or" rather than an exclusive "or." For example, the phrase "A or B" is intended to include instances of A, B, and both A and B. Additionally, the articles "a" and "an" as used in this application and the appended claims should generally be construed to mean "one or more" unless either otherwise specified or clear from the context to be directed to a singular form.

The term "set" as employed herein excludes the empty set, i.e., the set with no elements therein. Thus, a "set" in the subject disclosure includes one or more elements or entities. Likewise, the term "group" as utilized herein refers to a collection of one or more entities.

The terms "first," "second," "third," and so forth, as used in the claims, unless otherwise clear by context, is for clarity only and doesn't otherwise indicate or imply any order in time. For instance, "a first determination," "a second determination," and "a third determination," does not indicate or imply that the first determination is to be made before the second determination, or vice versa, etc.

As used in this disclosure, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component can be, but is not limited to being, a process running on a processor, a processor, an object, an executable, a thread of execution, computer-executable instructions, a program, and/or a computer. By way of illustration and not limitation, both an application running on a server and the server can be a component.

One or more components can reside within a process and/or thread of execution and a component can be localized on one computer and/or distributed between two or more computers. In addition, these components can execute from various computer readable media having various data structures stored thereon. The components can communicate via local and/or remote processes such as in accordance with a signal having one or more data packets (e.g., data from one component interacting with another component in a local system, distributed system, and/or across a network such as the internet with other systems via the signal). As another example, a component can be an apparatus with specific functionality provided by mechanical parts operated by electric or electronic circuitry, which is operated by a software application or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

The term "facilitate" as used herein is in the context of a system, device or component "facilitating" one or more actions or operations, in respect of the nature of complex computing environments in which multiple components and/or multiple devices can be involved in some computing operations. Non-limiting examples of actions that may or may not involve multiple components and/or multiple devices comprise transmitting or receiving data, establishing a connection between devices, determining intermediate results toward obtaining a result, etc. In this regard, a computing device or component can facilitate an operation by playing any part in accomplishing the operation. When operations of a component are described herein, it is thus to be understood that where the operations are described as facilitated by the component, the operations can be optionally completed with the cooperation of one or more other computing devices or components, such as, but not limited to, sensors, antennae, audio and/or visual output devices, other devices, etc.

Further, the various embodiments can be implemented as a method, apparatus or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable (or machine-readable) device or computer-readable (or machine-readable) storage/communications media. For example, computer readable storage media can comprise, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

Moreover, terms such as "mobile device equipment," "mobile station," "mobile," "subscriber station," "access terminal," "terminal," "handset," "communication device," "mobile device" (and/or terms representing similar terminology) can refer to a wireless device utilized by a subscriber or mobile device of a wireless communication service to receive or convey data, control, voice, video, sound, gaming or substantially any data-stream or signaling-stream. The foregoing terms are utilized interchangeably herein and with reference to the related drawings. Likewise, the terms "access point (AP)," "Base Station (BS)," "BS transceiver," "BS device," "cell site," "cell site device," "gNode B (gNB)," "evolved Node B (eNode B, eNB)," "home Node B (HNB)" and the like, refer to wireless network components or appliances that transmit and/or receive data, control, voice, video, sound, gaming or substantially any data-stream or signaling-stream from one or more subscriber stations. Data and signaling streams can be packetized or frame-based flows.

Furthermore, the terms "device," "communication device," "mobile device," "subscriber," "client entity," "consumer," "client entity," "entity" and the like are employed interchangeably throughout, unless context warrants particular distinctions among the terms. It should be appreciated that such terms can refer to human entities or automated components supported through artificial intelligence (e.g., a capacity to make inference based on complex mathematical formalisms), which can provide simulated vision, sound recognition and so forth.

It should be noted that although various aspects and embodiments are described herein in the context of 5G or other next generation networks, the disclosed aspects are not limited to a 5G implementation, and can be applied in other network next generation implementations, such as sixth generation (6G), or other wireless systems. In this regard, aspects or features of the disclosed embodiments can be exploited in substantially any wireless communication technology. Such wireless communication technologies can include universal mobile telecommunications system (UMTS), global system for mobile communication (GSM), code division multiple access (CDMA), wideband CDMA (WCMDA), CDMA2000, time division multiple access (TDMA), frequency division multiple access (FDMA), multi-carrier CDMA (MC-CDMA), single-carrier CDMA (SC-CDMA), single-carrier FDMA (SC-FDMA), orthogonal frequency division multiplexing (OFDM), discrete Fourier transform spread OFDM (DFT-spread OFDM), filter bank based multi-carrier (FBMC), zero tail DFT-spread-OFDM (ZT DFT-s-OFDM), generalized frequency division multiplexing (GFDM), fixed mobile convergence (FMC), universal fixed mobile convergence (UFMC), unique word OFDM (UW-OFDM), unique word DFT-spread OFDM (UW DFT-Spread-OFDM), cyclic prefix OFDM (CP-OFDM), resource-block-filtered OFDM, wireless fidelity (Wi-Fi), worldwide interoperability for microwave access (WiMAX), wireless local area network (WLAN), general packet radio service (GPRS), enhanced GPRS, third generation partnership project (3GPP), long term evolution (LTE), 5G, third generation partnership project 2 (3GPP2), ultra-mobile broadband (UMB), high speed packet access (HSPA), evolved high speed packet access (HSPA+), high-speed downlink packet access (HSDPA), high-speed uplink packet access (HSUPA), Zigbee, or another institute of electrical and electronics engineers (IEEE) 802.12 technology.

The description of illustrated embodiments of the subject disclosure as provided herein, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as one skilled in the art can recognize. In this regard, while the subject matter has been described herein in connection with various embodiments and corresponding drawings, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A system, located on a vehicle, comprising:
   a memory that stores computer executable components; and
   a processor that executes at least one of the computer executable components that:
      determines, via at least one sensor, a proximity of a cyclist to the vehicle, wherein the cyclist is cycling on a road where the vehicle is parked;
      determines, at least one of:
         an age of the cyclist;
         a level of distraction of the cyclist; or
         a stability of the cyclist on a bicycle as the cyclist approaches the vehicle;
      determines a probability of a dooring incident occurring in the event of an occupant of the vehicle opening a door of the vehicle to exit the vehicle when the cyclist is proximate to the vehicle; and
      in response to a first determination that the probability is above a probability threshold, prevents the occupant from exiting the vehicle until the probability is not above the probability threshold, wherein the probability threshold is based on at least one of the age of the cyclist, the level of distraction of the cyclist, or the stability of the cyclist on the bicycle.

2. The system of claim 1, wherein the at least one of the computer executable components further:
   prevents opening of the door of the vehicle while the probability of a dooring incident occurring is above the probability threshold.

3. The system of claim 2, wherein the at least one of the computer executable components further:
   while preventing the occupant from exiting the vehicle, presents a notification to the occupant that the door of the vehicle is temporarily locked until the cyclist has passed the vehicle.

4. The system of claim 3, wherein the at least one of the computer executable components further:
   determines the cyclist has passed the vehicle; and
   in response to determining the cyclist has passed the vehicle, unlocks the door of the vehicle.

5. The system of claim 1, wherein the level of distraction of the cyclist is based on at least one of:
   visual focus of attention of the cyclist regarding an environment in which the cyclist is travelling;
   steering the bicycle with hands holding handlebars of the bicycle; or
   interaction with a portable device while operating the bicycle.

6. The system of claim 1, wherein the age of the cyclist is determined based on at least one of:
   a determined height of the cyclist; or
   facial analysis of the cyclist.

7. The system of claim 1, wherein the vehicle is being operated at least partially autonomously.

8. The system of claim 1, wherein the at least one of the computer executable components further:
   captures, via an image sensor, a sequence of images indicating at least one of a current location or a velocity of the cyclist.

9. The system of claim 8, wherein the at least one of the computer executable components further:
- determines, based on the sequence of images, a speed of travel of the cyclist;
- determines, based on the sequence of images, a direction of travel of the cyclist; and
- determines a proximity of the cyclist to the vehicle based on the speed of travel and the direction of travel of the cyclist.

10. The system of claim 1, wherein the at least one of the computer executable components further:
- in response to a second determination that the probability is not above the probability threshold, enables the occupant to exit the vehicle.

11. A method comprising:
- determining, by at least one processor located on a vehicle, via at least one sensor, a proximity of a cyclist to the vehicle, wherein the cyclist is cycling on a road where the vehicle is parked;
- determining, by the at least one processor, at least one of:
  - an age of the cyclist;
  - a level of distraction of the cyclist; or
  - a stability of the cyclist on a bicycle as the cyclist approaches the vehicle;
- determining, by the at least one processor, a probability of a dooring incident occurring in the event of an occupant of the vehicle opening a door of the vehicle to exit the vehicle when the cyclist is proximate to the vehicle; and
- in response to a first determination that the probability is above a probability threshold, preventing, by the at least one processor, the occupant from exiting the vehicle until the probability is not above the probability threshold, wherein the probability threshold is based on at least one of the age of the cyclist, the level of distraction of the cyclist, or the stability of the cyclist on the bicycle.

12. The method of claim 11, further comprising:
in response to a second determination that the probability is not above the probability threshold, enabling, by the at least one processor, the occupant to exit the vehicle.

13. The method of claim 11, further comprising:
while preventing the occupant from exiting the vehicle, present a notification to the occupant that the door of the vehicle is temporarily locked until the cyclist has passed the vehicle.

14. The method of claim 13, further comprising:
determine the cyclist has passed the vehicle; and
in response to determining the cyclist has passed the vehicle, unlock the door of the vehicle.

15. The method of claim 11, wherein the level of distraction of the cyclist is based on at least one of:
- visual focus of attention of the cyclist regarding an environment in which the cyclist is travelling;
- steering the bicycle with hands holding handlebars of the bicycle; or
- interaction with a portable device while operating the bicycle.

16. A computer program product comprising a computer readable storage medium having program instructions embodied therewith, the program instructions executable by a processor to cause the processor to:
- determine, via at least one sensor, a proximity of a cyclist to a vehicle, wherein the cyclist is cycling on a road where the vehicle is parked;
- determine at least one of:
  - an age of the cyclist;
  - a level of distraction of the cyclist; or
  - a stability of the cyclist on a bicycle as the cyclist approaches the vehicle;
- determine a probability of a dooring incident occurring in the event of an occupant of the vehicle opening a door of the vehicle to exit the vehicle when the cyclist is proximate to the vehicle; and
- in response to a first determination that the probability is above a probability threshold, prevent the occupant from exiting the vehicle until the probability is not above the probability threshold, wherein the probability threshold is based on at least one of the age of the cyclist, the level of distraction of the cyclist, or the stability of the cyclist on the bicycle.

17. The computer program product of claim 16, wherein the program instructions are further executable by the processor to cause the processor to:
in response to a second determination that the probability is not above the probability threshold, enable the occupant to exit the vehicle.

18. The computer program product of claim 16, wherein the program instructions are further executable by the processor to cause the processor to:
while preventing the occupant from exiting the vehicle, present a notification to the occupant that the door of the vehicle is temporarily locked until the cyclist has passed the vehicle.

19. The computer program product of claim 18, wherein the program instructions are further executable by the processor to cause the processor to:
determine the cyclist has passed the vehicle; and
in response to determining the cyclist has passed the vehicle, unlock the door of the vehicle.

20. The computer program product of claim 16, wherein the level of distraction of the cyclist is based on at least one of:
- visual focus of attention of the cyclist regarding an environment in which the cyclist is travelling;
- steering the bicycle with hands holding handlebars of the bicycle; or
- interaction with a portable device while operating the bicycle.

* * * * *